United States Patent
Zhang et al.

(10) Patent No.: US 12,395,291 B2
(45) Date of Patent: Aug. 19, 2025

(54) REFERENCE SIGNAL WINDOW CONFIGURATION FOR MOBILE NETWORK ENTITIES

(71) Applicant: QUALCOMM Incorporated, San Diego, CA (US)

(72) Inventors: Qian Zhang, Basking Ridge, NJ (US); Yan Zhou, San Diego, CA (US); Navid Abedini, Basking Ridge, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 399 days.

(21) Appl. No.: 17/746,762

(22) Filed: May 17, 2022

(65) Prior Publication Data
US 2023/0379107 A1 Nov. 23, 2023

(51) Int. Cl.
*H04L 5/00* (2006.01)
*H04W 24/08* (2009.01)
*H04W 74/0808* (2024.01)

(52) U.S. Cl.
CPC ........... *H04L 5/0048* (2013.01); *H04W 24/08* (2013.01); *H04W 74/0808* (2013.01)

(58) Field of Classification Search
CPC ................ H04L 5/0048; H04W 24/08; H04W 74/0808; H04B 17/345
See application file for complete search history.

(56) References Cited

U.S. PATENT DOCUMENTS

| | | | |
|---|---|---|---|
| 11,206,549 B1* | 12/2021 | Eyuboglu | H04W 72/1273 |
| 2018/0323916 A1 | 11/2018 | Yang et al. | |
| 2020/0228213 A1* | 7/2020 | Masal | H04L 5/14 |
| 2021/0321281 A1* | 10/2021 | Wei | H04W 24/10 |
| 2022/0278788 A1* | 9/2022 | Pedersen | H04L 5/0035 |
| 2023/0060168 A1* | 3/2023 | Sun | H04L 5/0057 |
| 2024/0072960 A1* | 2/2024 | Ghanbarinejad | H04L 5/0051 |
| 2024/0187080 A1* | 6/2024 | Ghanbarinejad | H04B 7/088 |

FOREIGN PATENT DOCUMENTS

| EP | 3567759 A1 | 11/2019 |
|---|---|---|
| WO | 2021203410 A1 | 10/2021 |

OTHER PUBLICATIONS

International Search Report and Written Opinion—PCT/US2023/021397—ISA/EPO—Sep. 8, 2023.

* cited by examiner

*Primary Examiner* — Steven Hieu D Nguyen
(74) *Attorney, Agent, or Firm* — Loza & Loza, LLP

(57) ABSTRACT

Aspects of the present disclosure provide mechanisms for facilitating cross-link interference (CLI) measurement and reporting for mobile network entities using a common window configuration for communication of reference signals. The common window configuration may indicate a plurality of occasions within a respective window of each of one or more cycles for communicating one or more reference signals. A network entity (e.g., a mobile network entity or a stationary network entity) may utilize the common window configuration to receive a reference signal from another network entity within an occasion of the plurality of occasions in order to obtain a CLI measurement indicating the CLI between the network entities.

26 Claims, 21 Drawing Sheets

REFERENCE SIGNAL WINDOW CONFIGURATION FOR MOBILE NETWORK ENTITIES

TECHNICAL FIELD

The technology discussed below relates generally to wireless communication systems, and more particularly, to configuring windows for the transmission and reception of reference signals to identify cross-link interference between mobile network entities or between a mobile network entity and a stationary network entity.

INTRODUCTION

In wireless communication systems, such as those specified under standards for 5G New Radio (NR), a network entity (e.g., a base station) may communicate with a user equipment (UE) (e.g., a smartphone). Transmissions over an air interface from a network entity to one or more UEs are referred to as downlink (DL) transmissions, while transmissions from a UE to a network entity are referred to as uplink (UL) transmissions.

Each of the network entity and the UE may communicate in a half-duplex mode, in which only one node may transmit at a time (e.g., each time resource may be allocated for either a DL transmission or an UL transmission), or a full-duplex mode, in which both nodes may simultaneous transmit (e.g., each time resource may be allocated for both a DL transmission and an UL transmission). Half-duplex is frequently implemented for wireless links utilizing time division duplex (TDD).

In 5G wireless systems, UL and DL TDD transmissions may be dynamically scheduled to adapt to the traffic load in the network. Dynamic TDD and full-duplex network configurations may suffer from cross-link interference between network entities. For example, cross-link interference may result from a downlink transmission occurring simultaneously to an uplink transmission. In an example, a downlink transmission may be originated by one network entity, while an uplink transmission is received by another neighboring network entity.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a first network entity configured for wireless communication is disclosed. The first network entity includes a memory and a processor coupled to the memory. The processor is configured to receive a common window configuration for a plurality of mobile network entities from a central network entity. The common window configuration includes a plurality of occasions within a respective window of each of one or more cycles for communicating one or more reference signals. The processor is further configured to receive a first reference signal from a second network entity within a first occasion of the plurality of occasions, where at least one of the first network entity or the second network entity is one of the plurality of mobile network entities. The processor is further configured to obtain a cross-link interference measurement indicating a cross-link interference between the first network entity and the second network entity based on the first reference signal.

Another example provides a method operable at a first network entity. The method includes receiving a common window configuration for a plurality of mobile network entities from a central network entity. The common window configuration includes a plurality of occasions within a respective window of each of one or more cycles for communicating one or more reference signals. The method further includes receiving a first reference signal from a second network entity within a first occasion of the plurality of occasions, where at least one of the first network entity or the second network entity is one of the plurality of mobile network entities. The method further includes obtaining a cross-link interference measurement indicating a cross-link interference between the first network entity and the second network entity based on the first reference signal.

Another example provides a central network entity, including a memory and a processor coupled to the memory. The processor is configured to provide a common window configuration for a plurality of mobile network entities. The common window configuration includes a plurality of occasions within a respective window of each of one or more cycles for communicating one or more reference signals. The processor is further configured to receive at least one cross-link interference measurement report indicating a cross-link interference between neighbor network entities, where at least one of the neighbor network entities is one of the plurality of mobile network entities.

Another example provides a method operable at a central network entity. The method includes providing a common window configuration for a plurality of mobile network entities. The common window configuration includes a plurality of occasions within a respective window of each of one or more cycles for communicating one or more reference signals. The method further includes receiving at least one cross-link interference measurement report indicating a cross-link interference between neighbor network entities, where at least one of the neighbor network entities is one of the plurality of mobile network entities.

These and other aspects will become more fully understood upon a review of the detailed description, which follows. Other aspects, features, and examples will become apparent to those of ordinary skill in the art upon reviewing the following description of specific exemplary aspects in conjunction with the accompanying figures. While features may be discussed relative to certain examples and figures below, all examples can include one or more of the features discussed herein. In other words, while one or more examples may be discussed as having certain features, one or more of such features may also be used in accordance with the various examples discussed herein. Similarly, while examples may be discussed below as device, system, or method examples, it should be understood that such examples can be implemented in various devices, systems, and methods.

DETAILED DESCRIPTION

Figure 1:
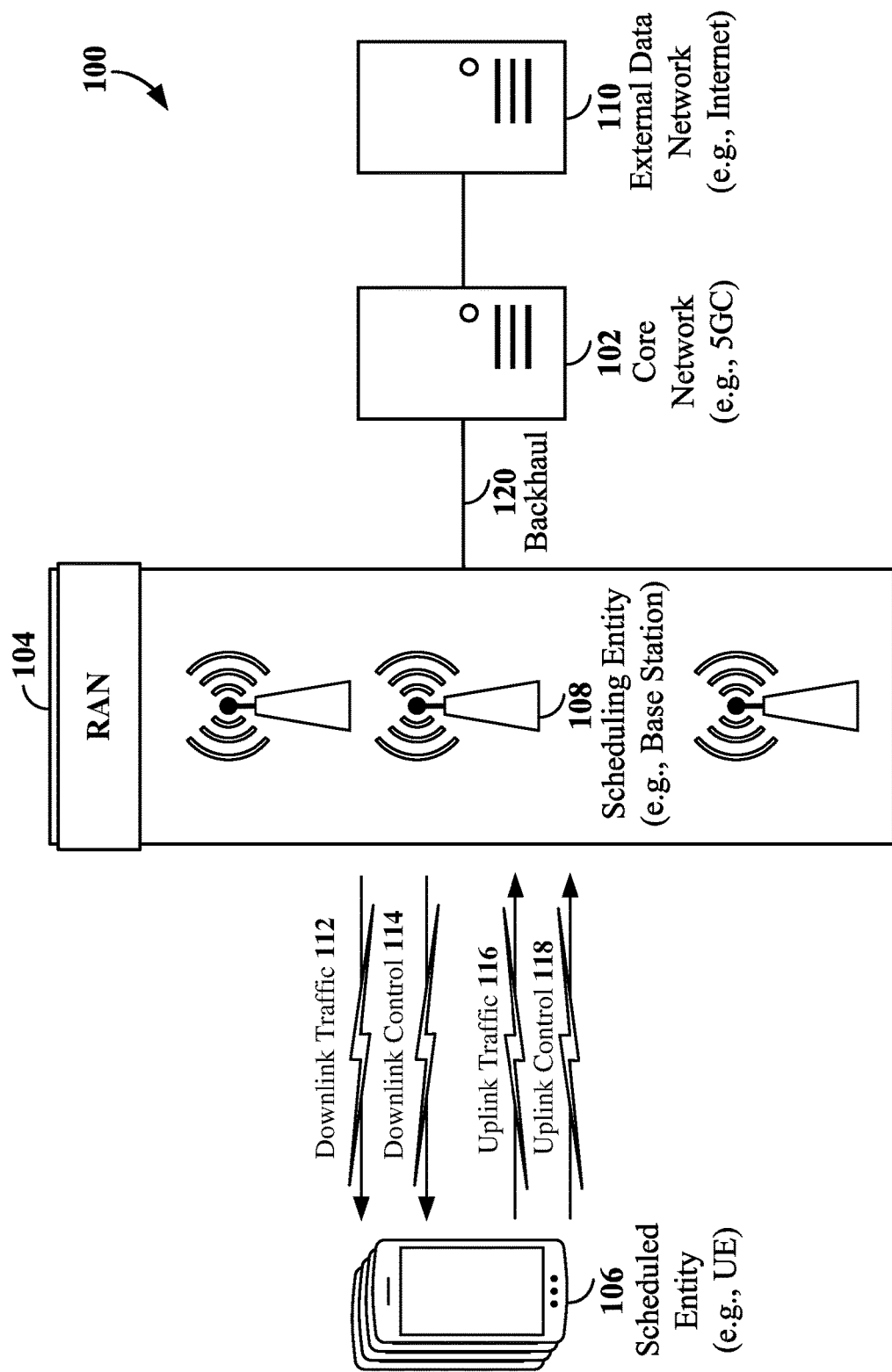
FIG. 1 is a diagram illustrating an example of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component-based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for the implementation and practice of claimed and described examples. For example, transmission and reception of wireless signals necessarily includes a number of components for analog and digital purposes (e.g., hardware components including antenna, radio frequency (RF) chains (RF-chains), power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., base station and/or UE), end-user devices, etc., of varying sizes, shapes, and constitution.

Various aspects of the disclosure provide techniques for facilitating cross-link interference (CLI) measurement between network entities in examples in which at least one network entity is a mobile network entity. A central network entity (e.g., a central unit (CU), real-time or non-real-time intelligent controller, or core network node) may generate and provide a common window configuration for mobile network entities. The common window configuration may indicate a plurality of occasions within a window for communicating reference signals, such as synchronization signal blocks (SSBs). Network entities may utilize the common window configuration to measure the CLI with neighbor network entities. For example, a network entity may transmit a reference signal within one occasion of the window and listen for reference signals from other neighbor network entities within other occasions of the window.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station. In addition, one or more of the base stations may have a disaggregated configuration.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present disclosure, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between the RAN 104 and the UE 106 may be described as utilizing an air interface. Transmissions over the air interface from a base station (e.g., base station 108) to one or more UEs (e.g., similar to UE 106) may be referred to as downlink (DL) transmissions. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, a scheduling entity 108 may broadcast downlink traffic 112 to one or more scheduled entities (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities (e.g., one or more UEs 106) to the scheduling entity 108. On the other hand, the scheduled entity (e.g., a UE 106) is a node or device that receives downlink control information 114, including but not limited to scheduling information (e.g., a grant), synchronization or timing information, or other control information from another entity in the wireless communication network such as the scheduling entity 108. The scheduled entity 106 may further transmit uplink control information 118, including but not limited to a scheduling request or feedback information, or other control information to the scheduling entity 108.

In addition, the uplink and/or downlink control information 114 and/or 118 and/or traffic 112 and/or 116 information may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system 100. The backhaul portion 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
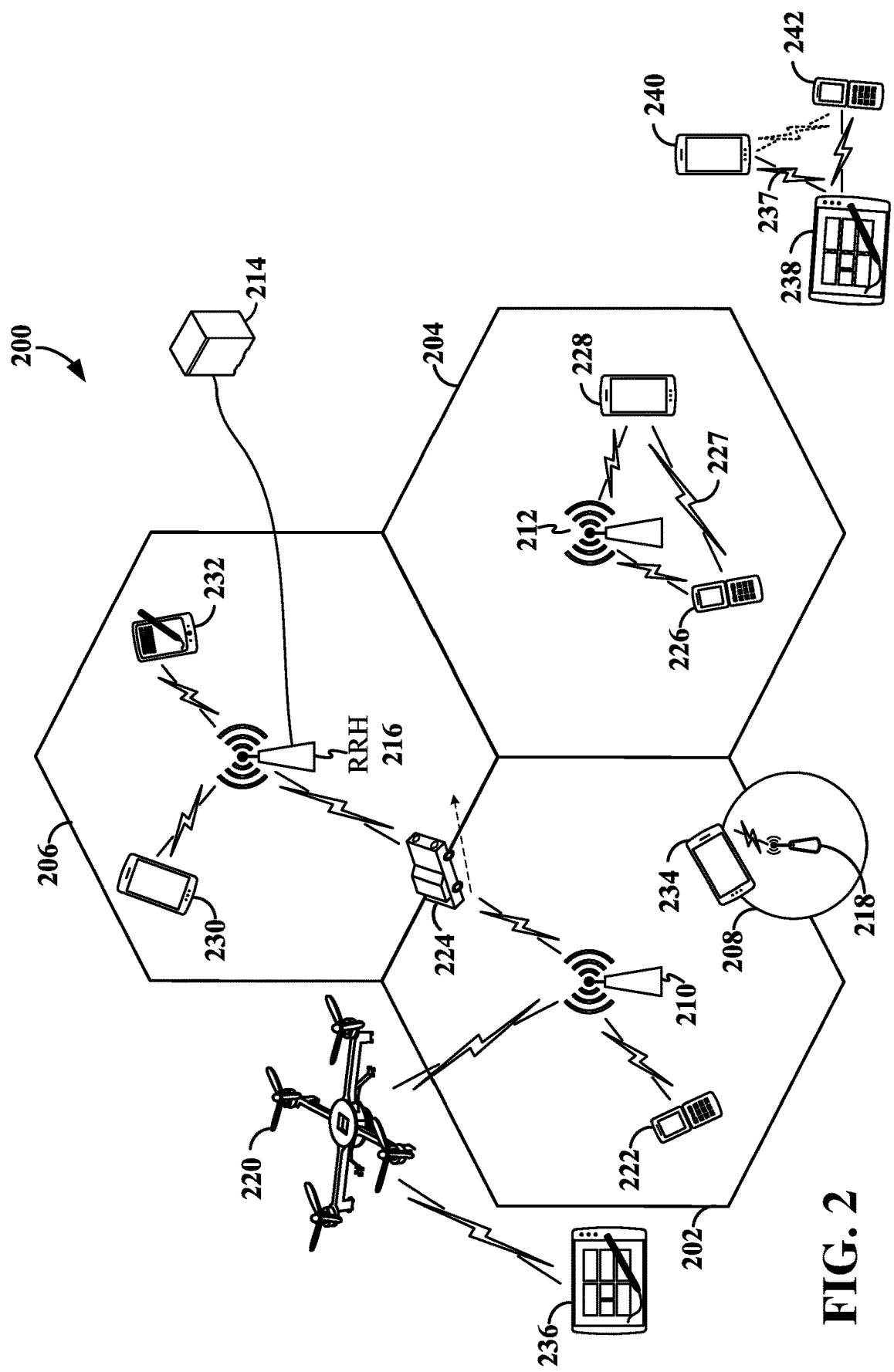
FIG. 2 is a diagram illustrating an example of a radio access network (RAN) according to some aspects.

Referring now to FIG. 2, as an illustrative example without limitation, a schematic illustration of a radio access network (RAN) 200 according to some aspects of the present disclosure is provided. In some examples, the RAN 200 may be the same as the RAN 104 described above and illustrated in FIG. 1.

The geographic region covered by the RAN 200 may be divided into a number of cellular regions (cells) that can be uniquely identified by a user equipment (UE) based on an identification broadcasted over a geographical area from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as or similar to the scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as or similar to the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In some examples, a D2D relay framework may be included within a cellular network to facilitate relaying of communication to/from the base station 212 via D2D links (e.g., sidelinks 227 or 237). For example, one or more UEs (e.g., UE 228) within the coverage area of the base station 212 may operate as relaying UEs to extend the coverage of the base station 212, improve the transmission reliability to one or more UEs (e.g., UE 226), and/or to allow the base station to recover from a failed UE link due to, for example, blockage or fading.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 200, the ability of UEs to communicate while moving, independent of their location, is referred to as mobility. The various physical channels between the UE and the RAN 200 are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, the UE 224 may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCHs)). The UEs 222, 224, 226, 228, 230, and 232 may receive the unified synchronization signals, derive the carrier frequency, and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the RAN 200 may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

Devices communicating in the radio access network 200 may utilize one or more multiplexing techniques and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Devices in the radio access network 200 may also utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
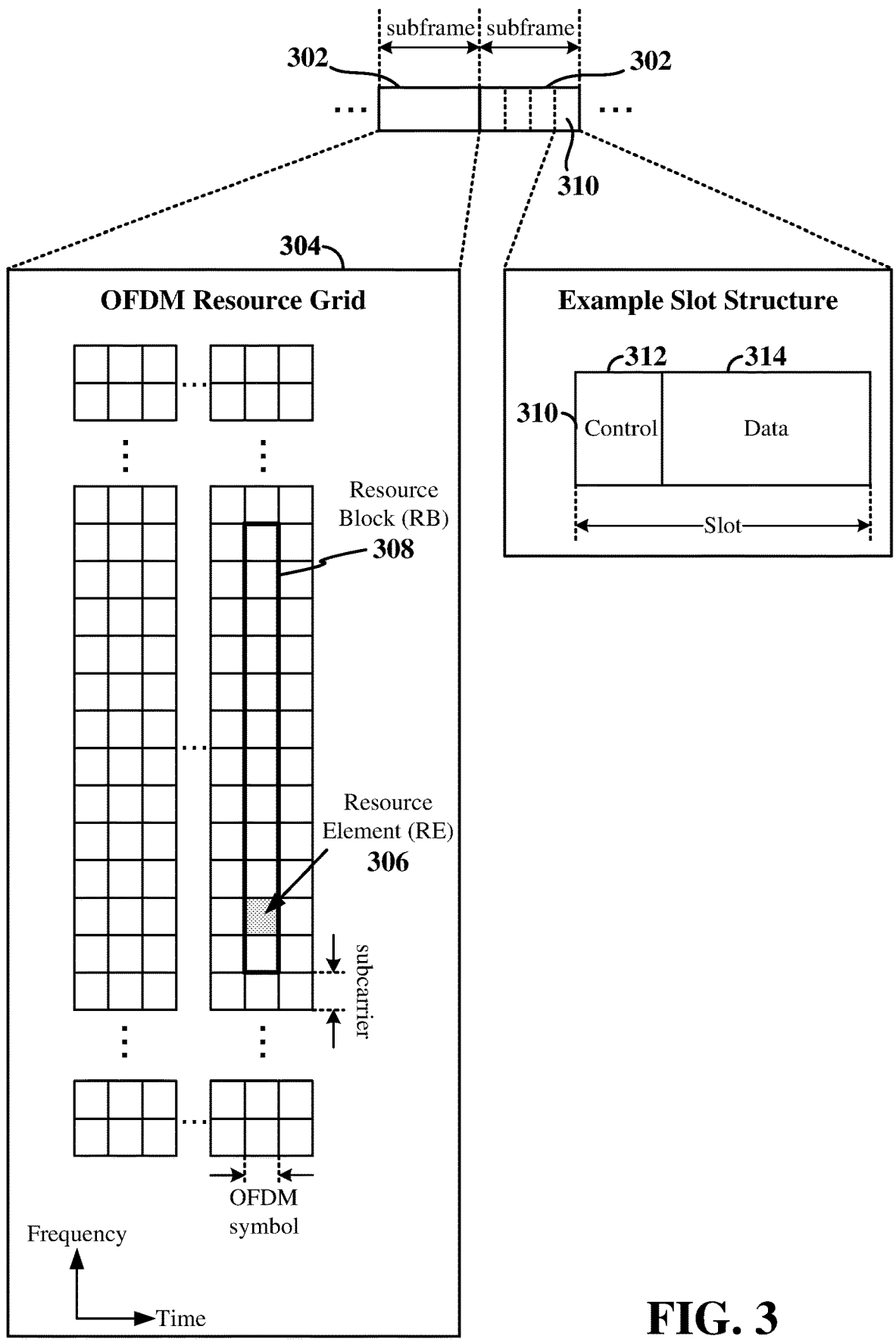
FIG. 3 is a schematic illustration of an organization of wireless resources in an air interface utilizing orthogonal frequency divisional multiplexing (OFDM) according to some aspects.

Referring now to FIG. 3, an expanded view of an exemplary subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgement (ACK) or negative acknowledgement (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs. In some examples, the PDSCH may carry a plurality of SIBs, not limited to SIB1, discussed above. For example, the OSI may be provided in these SIBs, e.g., SIB2 and above.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB (gNB), access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 4:
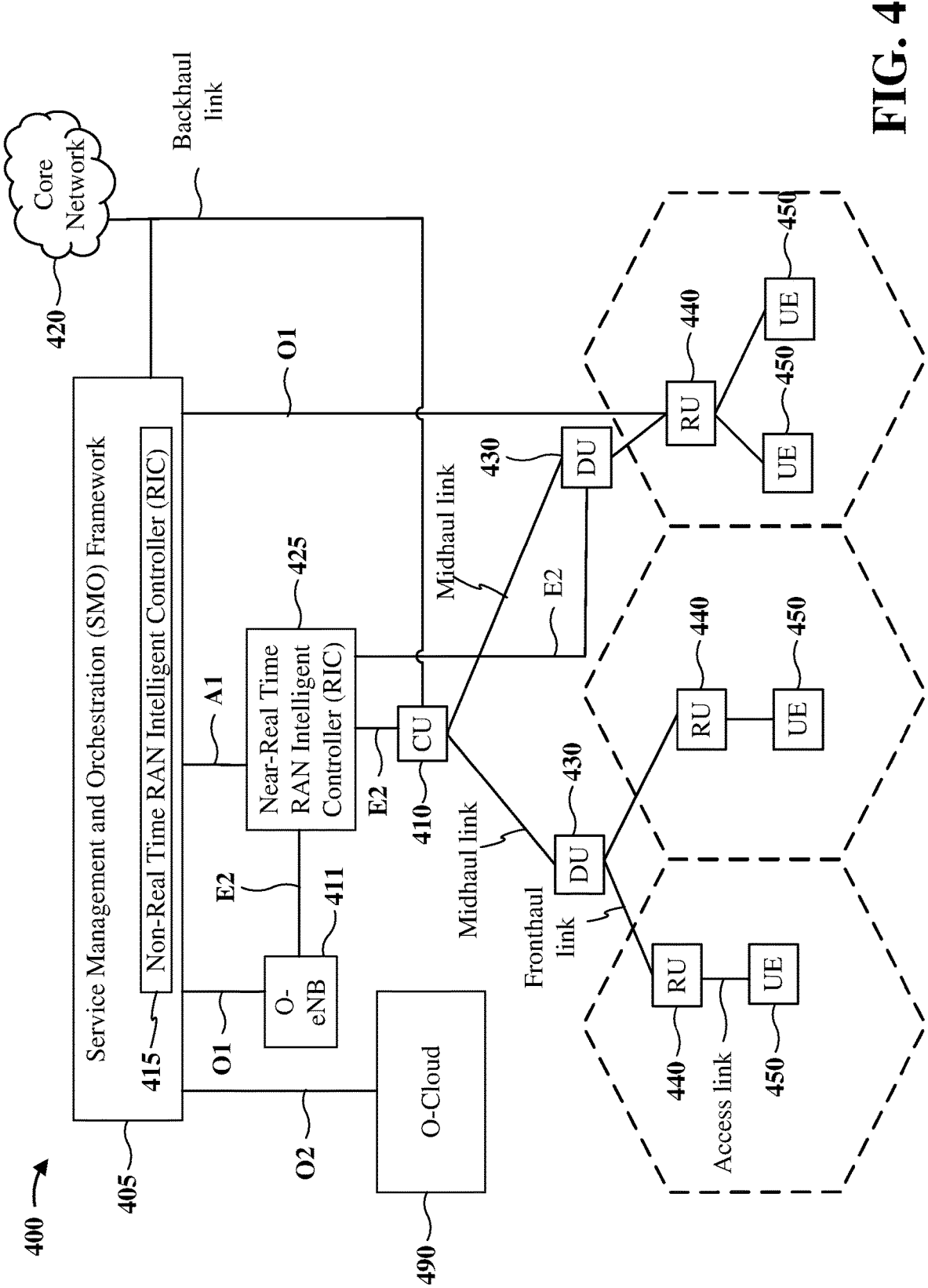
FIG. 4 is a diagram providing a high-level illustration of one example of a configuration of a disaggregated base station according to some aspects.

FIG. 4 shows a diagram illustrating an example disaggregated base station 400 architecture. The disaggregated base station 400 architecture may include one or more central units (CUs) 410 that can communicate directly with a core network 420 via a backhaul link, or indirectly with the core network 420 through one or more disaggregated base station units (such as a Near-Real Time (Near-RT) RAN Intelligent Controller (RIC) 425 via an E2 link, or a Non-Real Time (Non-RT) RIC 415 associated with a Service Management and Orchestration (SMO) Framework 405, or both). A CU 410 may communicate with one or more distributed units (DUs) 430 via respective midhaul links, such as an F1 interface. The DUs 430 may communicate with one or more radio units (RUs) 440 via respective fronthaul links. The RUs 440 may communicate with respective UEs 450 via one or more radio frequency (RF) access links. In some implementations, the UE 450 may be simultaneously served by multiple RUs 440.

Each of the units, i.e., the CUs 410, the DUs 430, the RUs 440, as well as the Near-RT RICs 425, the Non-RT RICs 415 and the SMO Framework 405, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 410 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 410. The CU 410 may be configured to handle user plane functionality (i.e., Central Unit-User Plane (CU-UP)), control plane functionality (i.e., Central Unit-Control Plane (CU-CP)), or a combination thereof. In some implementations, the CU 410 can be logically split into one or more CU-UP units and one or more CU-CP units. The CU-UP unit can communicate bidirectionally with the CU-CP unit via an interface, such as the E1 interface when implemented in an O-RAN configuration. The CU 410 can be implemented to communicate with the DU 430, as necessary, for network control and signaling.

The DU 430 may correspond to a logical unit that includes one or more base station functions to control the operation of one or more RUs 440. In some aspects, the DU 430 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 430 may further host one or more low PHY layers. Each layer (or module) can be implemented with an interface configured to communicate signals with other layers (and modules) hosted by the DU 430, or with the control functions hosted by the CU 410.

Lower-layer functionality can be implemented by one or more RUs 440. In some deployments, an RU 440, controlled by a DU 430, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 440 can be implemented to handle over the air (OTA) communication with one or more UEs 450. In some implementations, real-time and non-real-time aspects of control and user plane communication with the RU(s) 440 can be controlled by the corresponding DU 430. In some scenarios, this configuration can enable the DU(s) 430 and the CU 410 to be implemented in a cloud-based RAN architecture, such as a vRAN architecture.

The SMO Framework 405 may be configured to support RAN deployment and provisioning of non-virtualized and virtualized network elements. For non-virtualized network elements, the SMO Framework 405 may be configured to support the deployment of dedicated physical resources for RAN coverage requirements which may be managed via an operations and maintenance interface (such as an O1 interface). For virtualized network elements, the SMO Framework 405 may be configured to interact with a cloud computing platform (such as an open cloud (O-Cloud) 490) to perform network element life cycle management (such as to instantiate virtualized network elements) via a cloud computing platform interface (such as an O2 interface). Such virtualized network elements can include, but are not limited to, CUs 410, DUs 430, RUs 440 and Near-RT RICs 425. In some implementations, the SMO Framework 405 can communicate with a hardware aspect of a 4G RAN, such as an open eNB (O-eNB) 411, via an O1 interface. Additionally, in some implementations, the SMO Framework 405 can communicate directly with one or more RUs 440 via an O1 interface. The SMO Framework 405 also may include a Non-RT RIC 415 configured to support functionality of the SMO Framework 405.

The Non-RT RIC 415 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 425. The Non-RT RIC 415 may be coupled to or communicate with (such as via an A1 interface) the Near-RT RIC 425. The Near-RT RIC 425 may be configured to include a logical function that enables near-real-time control and optimization of RAN elements and resources via data collection and actions over an interface (such as via an E2 interface) connecting one or more CUs 410, one or more DUs 430, or both, as well as an O-eNB, with the Near-RT RIC 425.

In some implementations, to generate AI/ML models to be deployed in the Near-RT RIC 425, the Non-RT RIC 415 may receive parameters or external enrichment information from external servers. Such information may be utilized by the Near-RT RIC 425 and may be received at the SMO Framework 405 or the Non-RT RIC 415 from non-network data sources or from network functions. In some examples, the Non-RT RIC 415 or the Near-RT RIC 425 may be configured to tune RAN behavior or performance For example, the Non-RT RIC 415 may monitor long-term trends and patterns for performance and employ AI/ML models to perform corrective actions through the SMO Framework 405 (such as reconfiguration via O1) or via creation of RAN management policies (such as A1 policies).

Figure 5:
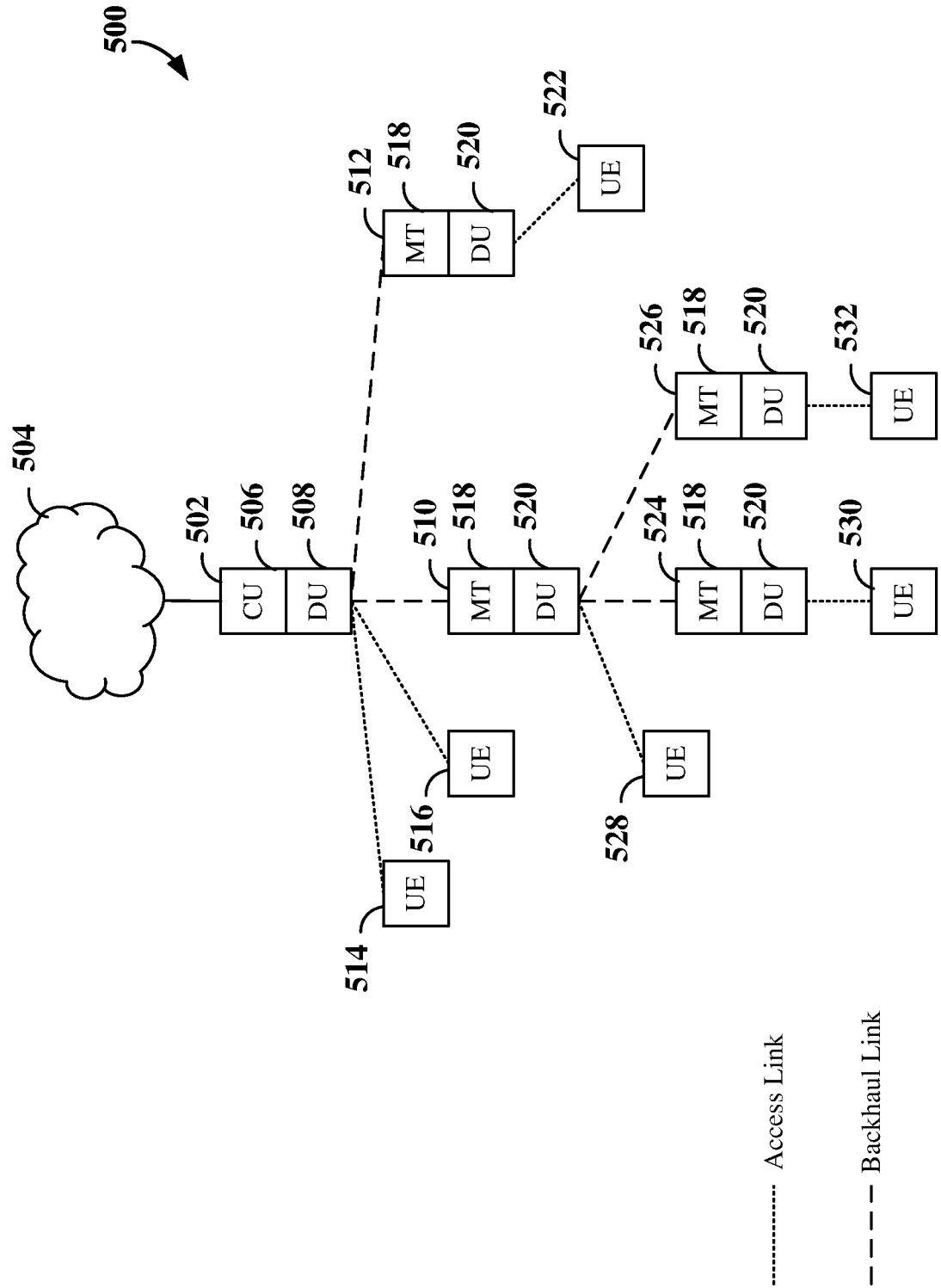
FIG. 5 is a schematic diagram illustrating an example of IAB node functionality within an IAB network according to some aspects.

FIG. 5 is a schematic diagram illustrating an example of IAB node functionality within an IAB network 500. In the example shown in FIG. 5, an IAB node 502 is shown coupled to a core network 504 via a wireline connection. This IAB node 502 may be referred to herein as an IAB donor node, which may be, for example, an aggregated or disaggregated enhanced gNB including functionality for controlling the IAB network 500. In some examples, the IAB donor node 502 may include a central unit (CU) 506 and a distributed unit (DU) 508. The CU 506 is configured to operate as a centralized network node (or central entity) within the IAB network 500. For example, the CU 506 may include radio resource control (RRC) layer functionality and packet data convergence protocol (PDCP) layer functionality to control/configure the other nodes (e.g., IAB nodes and UEs) within the IAB network 500. Thus, the CU 506 can be configured to implement centralized mechanisms for handover decisions, topology changes, routing, bearer mapping, UE security, and other suitable services.

The DU 508 is configured to operate as a scheduling entity to schedule scheduled entities (e.g., other IAB nodes and UEs) of the IAB donor node 502. For example, the DU 508 of the IAB donor node 502 may operate as a scheduling entity to schedule IAB nodes 510 and 512 and UEs 514 and 516. Thus, the DU 508 of the IAB donor node 502 may schedule communication with IAB nodes 510 and 512 via respective backhaul links and schedule communication with UEs 514 and 516 via respective access links. In some examples, the DU 508 may include the radio link control (RLC), medium access control (MAC), and physical (PHY) layer functionality to enable operation as a scheduling entity.

Each of the IAB nodes 510 and 512 may be configured as a Layer 2 (L2) relay node including a respective DU 520 and a mobile termination (MT) unit 518 to enable each L2 relay IAB node 510 and 512 to operate as a scheduling entity and a scheduled entity. For example, the MT unit 518 within each of the L2 relay IAB nodes 510 and 512 is configured to operate as a scheduled entity that may be scheduled by the IAB donor node 502. Each MT unit 518 within the L2 relay IAB nodes 510 and 512 further facilitates communication with the IAB donor node 502 via respective backhaul links. In addition, the DU 520 within each of the L2 relay IAB nodes 510 and 512 operates similar to the DU 508 within the IAB donor node 502 to function as a scheduling entity to schedule one or more respective scheduled entities (e.g., other IAB nodes and/or UEs) of the L2 relay IAB nodes 510 and 512.

For example, the DU 520 of L2 relay IAB node 512 functions as a scheduling entity to schedule communication with a UE 522 via an access link, while the DU 520 of L2 relay IAB node 510 functions as a scheduling entity to schedule communication with the MT units 518 of L2 relay IAB nodes 524 and 526 via respective backhaul links and a UE 528 via an access link Each of the L2 relay IAB nodes 524 and 526 further includes a respective DU 520 that functions as a scheduling entity to communicate with respective UEs 530 and 532.

In some examples, the IAB donor node 502, in combination with each of the L2 relay IAB nodes 510, 512, 524 and 526, can collectively form a disaggregated base station. The disaggregated base station includes the CU 506 and each of the DUs 508 and 520 controlled by the CU 506. The CU/DU functional split in disaggregated base stations can facilitate the realization of time-critical services, such as scheduling, retransmission, segmentation, and other similar services in the DU 508/520, while centralizing the less time-critical services in the CU 506. In addition, the CU/DU separation enables termination of external interfaces in the CU 506 instead of each DU, and further supports centralized termination of the PCDP to allow for dual connectivity and handover between the different DUs of the disaggregated base station. It should be understood that disaggregated base stations may be implemented within networks other than IAB networks, and the present disclosure is not limited to any particular type of network.

Figure 6:
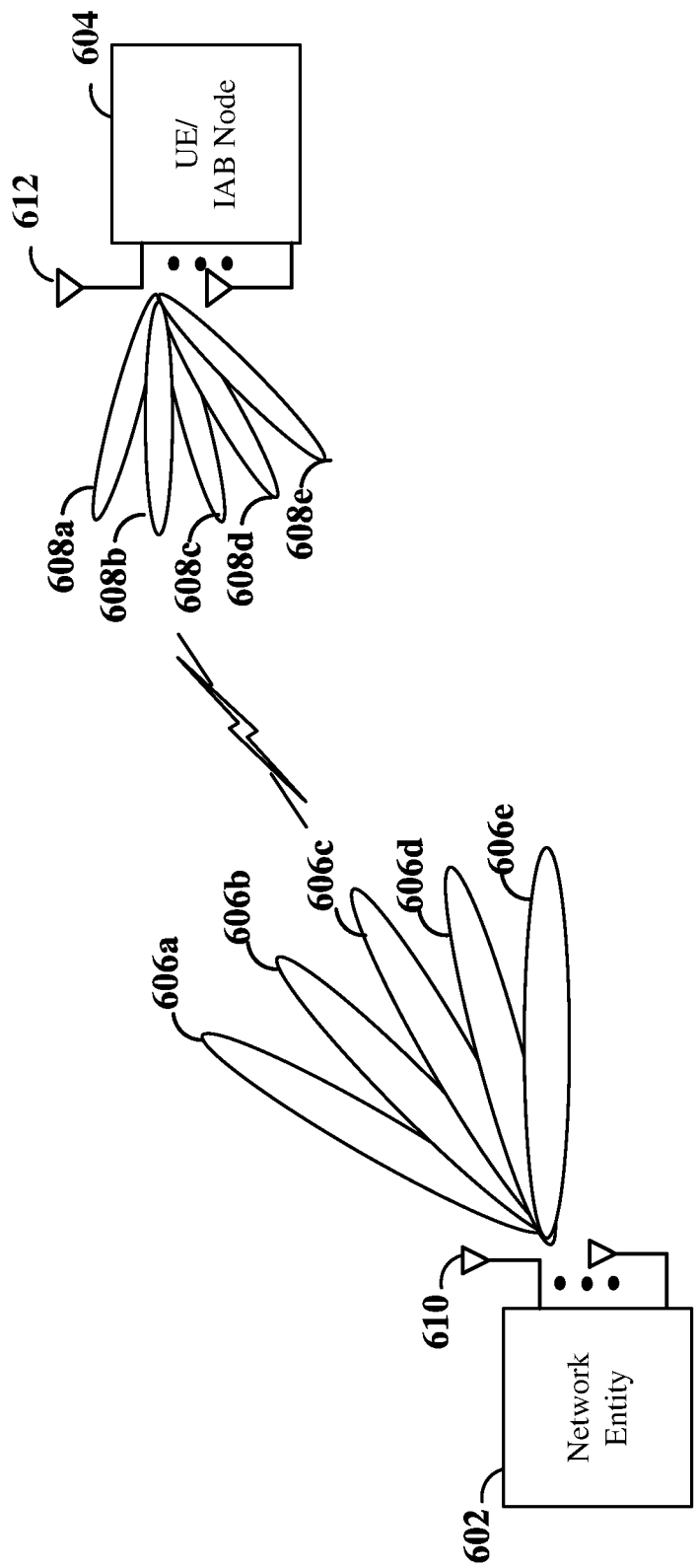
FIG. 6 illustrates an example of a wireless communication system supporting beamforming between network entities according to some aspects.

In some aspects of the disclosure, network entities and/or UEs may be configured for beamforming technology. FIG. 6 illustrates an example of a wireless communication system supporting beamforming between a network entity 602 and a UE 604. In a beamforming system, the network entity 602 includes multiple antennas 610. The use of such multiple antenna technology enables the wireless communication system to exploit the spatial domain to support spatial multiplexing, beamforming, and transmit diversity.

Beamforming is a signal processing technique that may be used at the network entity 602 and UE 604 to shape or steer an antenna beam (e.g., a transmit beam or receive beam) along a spatial path between the network entity 602 and the UE 604. Beamforming may be achieved by combining the signals communicated via antennas 610 (e.g., antenna elements of an antenna array or antenna panel) such that some of the signals experience constructive interference while others experience destructive interference. To create the desired constructive/destructive interference, the network entity 602 may apply amplitude and/or phase offsets to signals transmitted or received from each of the antennas 610. The UE 604 may further be configured with one or more beamforming antennas 612 (e.g., antenna panels) to transmit and/or receive beamformed signals to and/or from the network entity 602.

In the example shown in FIG. 6, the network entity 602 may be capable of generating one or more transmit/receive beams 606a-606e, each associated with a different spatial direction. In addition, the UE 604 may be configured to generate a plurality of transit/receive beams 608a-608e, each associated with a different spatial direction. It should be noted that while some beams are illustrated as adjacent to one another, such an arrangement may be different in different aspects. For example, the network entity 602 and UE 604 may each transmit more or less beams distributed in all directions (e.g., 350 degrees) and in three-dimensions.

The network entity 602 may generally be capable of communicating with the UE 604 using beams of varying beam widths. In some examples, to select a particular beam for communication with the UE 604, the network entity 602 may transmit a reference signal, such as a SSB or CSI-RS, on each of a plurality of beams (e.g., beams 606a-606e) in a beam-sweeping manner. In some examples, SSBs may be transmitted on the wider beams, whereas CSI-RSs may be transmitted on the narrower beams. The UE 604 may measure the reference signal received power (RSRP) or signal-to-interference-plus-noise ratio (SINR) on each of the beams and transmit a beam measurement report (e.g., a Layer 1 (L1) measurement report) to the network entity 602 indicating the RSRP or SINR of one or more of the measured beams. The network entity 602 may then select the particular beam for communication with the UE 604 based on the L1 measurement report.

To facilitate transmission and measurement of reference signals (e.g., SSBs), the network entity 602 and UE 604 may be configured (e.g., via a central network entity, such as a CU) with an SSB Measurement Time Configuration (SMTC) window and SSB Transmission Configuration (STC) window aligned to the periodicity (e.g., 20 ms) of SSB transmissions on the access link between the network entity 602 and the UE 604. The STC window and SMTC window may be configured at the network-level, so that each network entity 602 and UE 604 within a network operates using the same STC window and SMTC window. The STC window indicates a period of time (e.g., one or more slots, subframes, or frames) within which the network entity 602 may transmit SSBs (e.g., an SSB burst set including a plurality of SSBs transmitted in a beam-sweeping manner), SSBs are typically transmitted on a raster frequency (e.g., a synchronization raster), which indicates the frequency position of SSBs that can be used by the UE 604 for system acquisition when the SSB position is not known. The SMTC window is aligned with the STC window to enable the UE 604 to measure the SSBs transmitted from the network entity 602.

In examples in which the UE 604 is an IAB node including a DU and MT unit, the UE 604 would need to both transmit SSBs to UEs served by the IAB node and receive SSBs from IAB parent node(s), such as network entity 602. Therefore, in this example, multiple STC and corresponding SMTC windows may be configured for an IAB network. Each IAB node may be configured with a respective set of STC and SMTC windows, where the STC and SMTC windows are not aligned. Instead, the SMTC window utilized by an IAB MT unit may be aligned with an STC window of neighboring IAB nodes, so that the IAB MT unit may receive and measure SSBs of neighboring IAB DUs. The exchanged SSBs may be used, for example, to mitigate or minimize cross-link interference (CLI) between neighboring IAB DUs. For example, the IAB MT unit 604 may obtain a CLI measurement indicating the CLI between the IAB MT unit 604 and the network entity 602 based on one or more SSBs transmitted by the network entity 602 during the STC window of the network entity 602 that is aligned with the SMTC window of the IAB MT unit 604. The IAB MT unit 604 may then generate and transmit a CLI measurement report to, for example, a central network entity (e.g., a CU, real-time or non-real-time intelligent controller, or core network node, such as an Operations, Administration, and Management (OAM) function), to enable the central network entity to minimize or reduce CLI between the network entities 602 and 604.

CLI may occur when one network entity is transmitting, while another neighboring network entity is simultaneously receiving in the same frequency band. For example, in a dynamic TDD network configuration in which uplink and downlink transmissions may be dynamically scheduled based on the traffic load in the cell, one network entity may schedule a downlink transmission at the same time as another neighbor network entity schedules an uplink transmission, which may cause CLI. Moreover, in full-duplex configurations in which downlink transmissions may be performed by one antenna panel on the network entity (e.g., a DL antenna panel) while uplink receptions may be performed by another antenna panel (e.g., an UL antenna panel) on the network entity, neighboring network entities may simultaneously transmit and receive, which can result in CLI. Network entities typically transmit at higher power and have better propagation conditions therebetween, as compared to the link between a network entity and a UE. Thus, cross-link interference experienced at a network entity may be significant compared to that experienced at a UE. To minimize the CLI between network entities, the central network entity may synchronize uplink and downlink communication between neighboring network entities.

Figure 7:
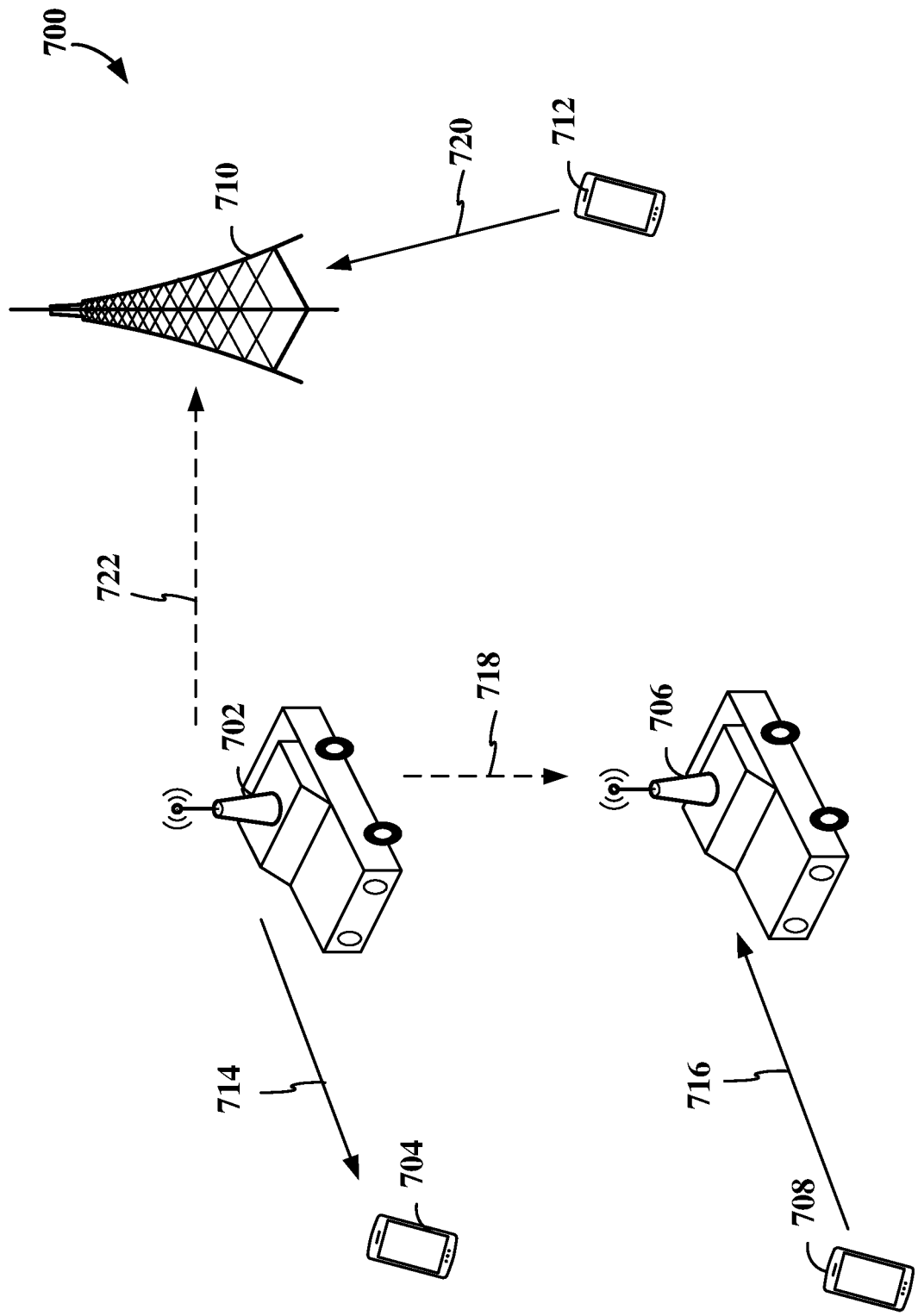
FIG. 7 is a diagram illustrating cross-link interference (CLI) in a wireless communication network according to some aspects.

However, in examples in which one or more of the network entities is a mobile network entity, such as a mobile IAB node, coordinated inter-network entity CLI measurement may not be possible due to the mobility of the network entities. FIG. 7 is a diagram illustrating cross-link interference (CLI) in a wireless communication network 700 according to some aspects. In the example shown in FIG. 7, mobile network entity 702 is in wireless communication with UE 704 and mobile network entity 706 is in wireless communication with UE 708. In addition, stationary (static) network entity 710 is in wireless communication with UE 712. Each of the network entities 702, 706, and 710 may be an aggregated network entity or a disaggregated network entity.

In some examples, network entities 702, 706, and 710 may be half-duplex network entities (e.g., network entities implementing dynamic TDD) or full-duplex network entities. In addition, one or more of mobile network entities (e.g., network entity 702) may be configured with a different uplink/downlink (UL/DL) configuration than the other mobile network entity 706 and/or the stationary network entity 710. The different UL/DL configurations may be a result, for example, of the mobility of the mobile network entities 702 and 706. Furthermore, the mobility of mobile network entities 702 and 706 may cause the mobile network entities 702 and 706 to be in close proximity to one another and to the stationary network entity 710.

As shown in FIG. 7, mobile network entity 702 may transmit a downlink transmission 714 to the UE 704 using a selected (scheduled) frequency resource (e.g., one or more subcarriers in a frequency band) and a time resource (e.g., symbol, slot, subframe, etc.). In addition, mobile network entity 706 may receive an uplink transmission 716 from the UE 708 on the same time resource in the same frequency band (e.g., on the same or adjacent subcarriers/channels). Since the downlink transmission 714 to the UE 704 occurs simultaneously to the uplink transmission 716 from the UE 708 on the same frequency band, the mobile network entity 706 may experience CLI 718 between the downlink transmission 714 and the uplink transmission 716 due to the proximity of the mobile network entities 702 and 706. In addition, stationary network entity 710 may further receive an uplink transmission 720 from the UE 712 on the same time resource in the same frequency band as the downlink transmission 714. Thus, stationary network entity 710 may also experience CLI 722 between the downlink transmission 714 and the uplink transmission 720 due to the proximity of the mobile network entity 702 and the stationary network entity 710.

In this example, the central network entity may not be able to configure separate STC/SMTC windows to each of the network entities 702, 706, and 710 due to the mobility of the network entities 702 and 706 in order to mitigate the CLI. For example, the central network entity may not be aware of the neighbor network entities (e.g., network entities 706 and 710) of the mobile network entity 702, and as a result, may not be able to configure inter-network entity CLI Tx/Rx windows (e.g., STC and SMTC windows) to avoid collision with neighbor network entities.

Various aspects of the disclosure relate to techniques for providing and utilizing a common window configuration for mobile network entities (e.g., network entities 702 and 706). The common window configuration may include a plurality of occasions within a respective window of each of one or more cycles for communicating reference signals (e.g., SSBs) between network entities. Within a window, a network entity may select one of the occasions to transmit a reference signal and may listen in the remaining occasions to receive reference signals from neighbor network entities. By providing such a common window configuration, CLI measurement between mobile network entities and between mobile and stationary network entities may be performed. As a result, mitigation efforts may be undertaken to reduce the CLI experienced by network entities 702, 706, and 710, thus improving reliability, reducing resource usage (e.g., due to multiple retransmissions), and extending the battery life of UEs and mobile network entities (e.g., by reducing the number of retransmissions that may be needed based on the CLI).

Figure 8A:
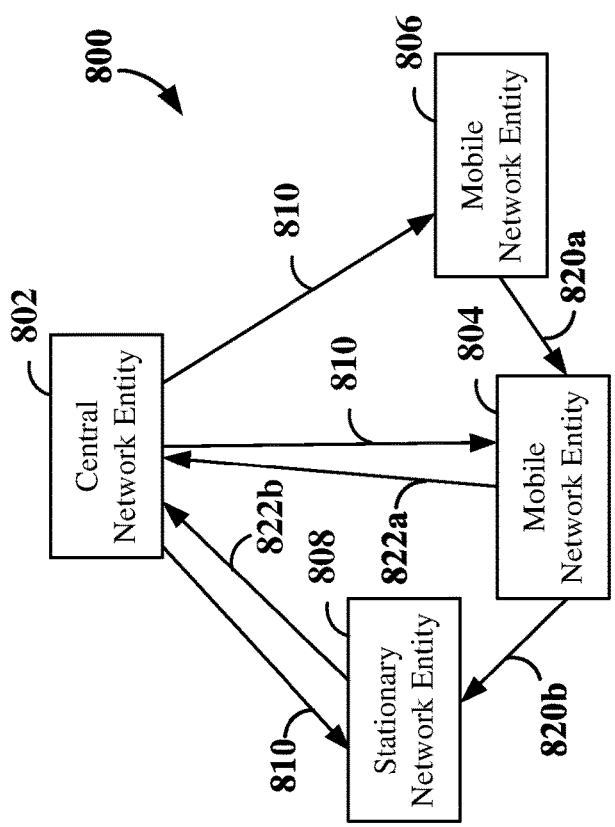
FIG. 8A is a diagram illustrating an example of a wireless communication network providing a common window configuration according to some aspects.

FIG. 8A is a diagram illustrating an example of a wireless communication network 800 providing a common window configuration according to some aspects. The wireless communication network 800 includes a central network entity 802, mobile network entities 804 and 806, and a stationary network entity 808. The central network entity 802 may correspond, for example, to the CU or real-time or non-real-time intelligent controller shown in FIG. 4 or to the CU shown in FIG. 5. The central network entity 802 may further correspond to a core network node, such as an OAM function. Each of the network entities 804, 806, and 808 may be aggregated or disaggregated network entities (e.g., may include one or more entities of a disaggregated base station) and/or may be IAB nodes.

The central network entity 802 may generate and provide a common window configuration 810 to each of the network entities 804, 806, and 808 according to some aspects. For example, the central network entity 802 may provide the common window configuration 810 to the stationary network entity 808 via a midhaul link or backhaul link. In addition, the central network entity 802 may provide the common window configuration 810 to the mobile network entities 804 and 806 via one or more additional aggregated/disaggregated network entities (e.g., via midhaul/backhaul links) and a wireless communication link between the mobile network entities 804 and 806 and the additional network entities (e.g., the stationary network entity 808). In some examples, the central network entity 802 may provide the common window configuration 810 to the network entities 804, 806, and 808 via a radio resource control (RRC) message. The common window configuration 810 may be periodic, aperiodic, semi-persistent, or event triggered.

Figure 8B:
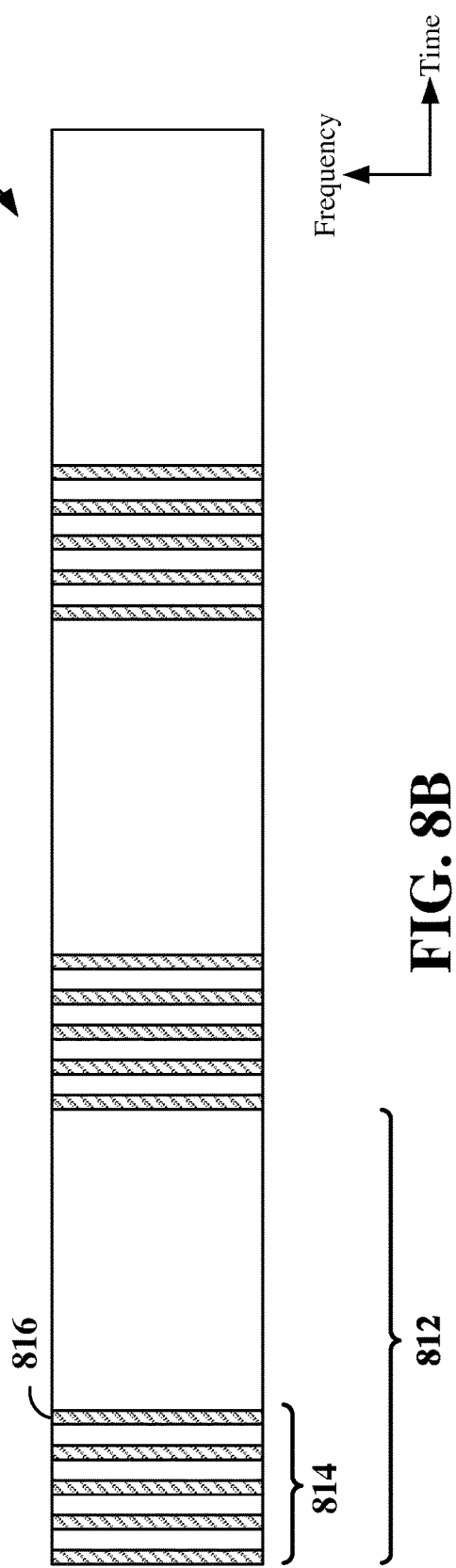
FIG. 8B illustrates an example of the common window configuration according to some aspects.

FIG. 8B illustrates an example of the common window configuration 810 according to some aspects. The common window configuration 810 includes a configuration of one or more cycles 812. Each cycle 812 includes a respective window 814 including a plurality of occasions 816 within which reference signals (e.g., SSBs) may be communicated. The common window configuration may further be configured with a window periodicity corresponding to a cycle duration (e.g., 20 ms). In an example, each window 814 may correspond to 5 ms of the 20 ms cycle 812. Each occasion 816 may correspond, for example, to one or more consecutive symbols of a slot in the window 814.

The network entities 804, 806, and 808 shown in FIG. 8A may use the common window configuration 810 shown in FIG. 8B to communicate reference signals therebetween in order to measure the CLI between the network entities 804, 806, and 808. For example, a mobile network entity (e.g., mobile network entity 806) may select one of the occasions 816 (e.g., a first occasion) on which to transmit a reference signal 820*a* (e.g., SSB) and may then listen on the remaining occasions 816 to receive SSBs from other neighboring mobile network entities. In addition, the mobile network entity 804 may select a different occasion (e.g., a second occasion) on which to transmit a reference signal 820*b* (e.g., SSB) and may then listen on the remaining occasions 816 to receive SSBs from other neighboring mobile network entities.

For example, mobile network entity 804 may receive the reference signal 820*a* from mobile network entity 806 on the first occasion. The mobile network entity 804 may then obtain a CLI measurement based on the reference signal 820*a* and generate and transmit a CLI measurement report 822*a* to the central network entity 802 for CLI mitigation. For example, the central network entity 802 may be configured to coordinate downlink and uplink transmissions between neighbor network entities 804, 806, and 808 experiencing high CLI to reduce or eliminate the CLI. In some examples, the mobile network entity 804 may generate the CLI measurement report 822*a* in response to the CLI measurement being greater than a threshold. The threshold may be preconfigured (e.g., via the original equipment manufacturer (OEM) based on one or more standards and/or specifications) or may be provided by the central network entity 802.

In addition, the stationary network entity 808 may listen during the occasions 816 to receive reference signals from neighboring mobile network entities 804 and 806. For example, the stationary network entity 808 may receive the reference signal 820*b* from mobile network entity 804 on the second occasion. The stationary network entity 808 may then obtain a CLI measurement based on the reference signal 820*b* and generate and transmit a CLI measurement report 822*b* to the central network entity 802 for CLI mitigation. In some examples, the stationary network entity 808 may generate the CLI measurement report 822*b* in response to the CLI measurement being greater than a threshold. The threshold used by the stationary network entity 808 may the same as the threshold used by mobile network entities 804 and 806 or may be a different threshold configured for stationary network entities 808.

Figure 9:
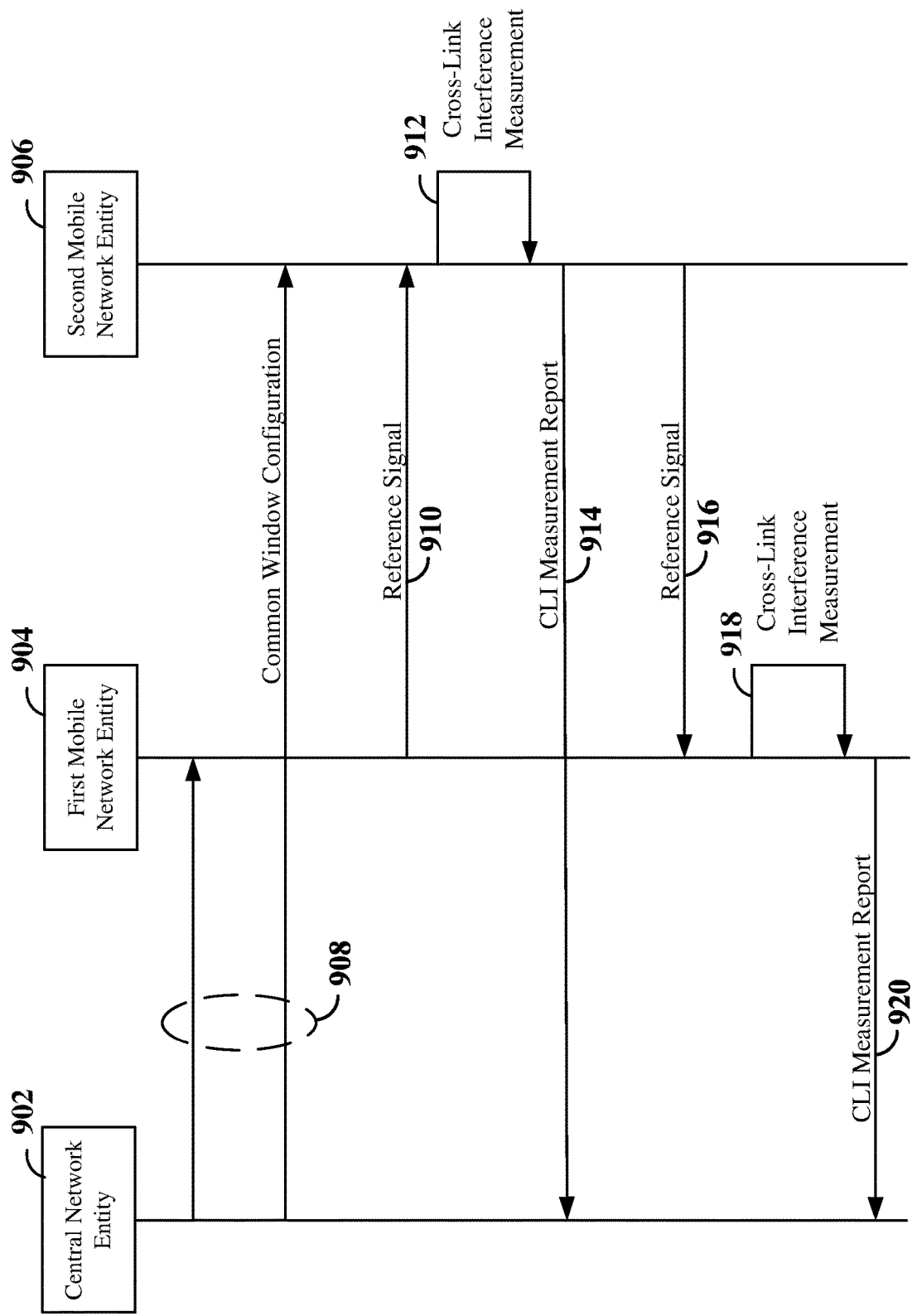
FIG. 9 is a signaling diagram illustrating exemplary signaling for CLI measurement using a common window configuration according to some aspects.

FIG. 9 is a diagram illustrating exemplary signaling between a central network entity 902 and mobile network entities 904 and 906 for CLI measurement using a common window configuration according to some aspects. The central network entity 902 may correspond, for example, to the CU or real-time or non-real-time intelligent controller shown in FIG. 4 or to the CU shown in FIG. 5. The central network entity 902 may further correspond to a core network node, such as an OAM function. Each of the mobile network entities 904 and 906 (first and second mobile network entities) may be aggregated or disaggregated network entities (e.g., may include one or more entities of a disaggregated base station) and/or may be IAB nodes.

At 908, the central network entity 902 may provide a common window configuration for mobile network entities 904 and 906 to communicate reference signals for CLI measurement and reporting. The common window configuration may include, for example, a plurality of occasions (e.g., N occasions) within each respective window of one or more cycles on which reference signals (e.g., SSBs) may be sent/received. In addition, the common window configuration may be a periodic window configuration (e.g., with a window periodicity corresponding to a cycle duration), aperiodic (e.g., dynamically configured for one or more cycles), or event-triggered (e.g., upon the occurrence of an event, the network entities 904 and 906 may begin using the common window configuration to communicate reference signals for CLI measurements). For example, the event may correspond to a request from a neighbor network entity to exchange reference signals for CLI measurement. As another example, the event may correspond to a threshold number of packets being dropped due to interference.

At 910, the first mobile network entity 904 may select a first occasion from the plurality of occasions and transmit a reference signal (e.g., an SSB) within the selected first occasion. In some examples, the first mobile network entity 904 may select the first occasion randomly per cycle or per a group of cycles. For example, the first mobile network entity 904 may randomly select the first occasion within a first cycle and may then randomly select another occasion within a second cycle. As another example, the first mobile network entity 904 may randomly select the first occasion for use in transmitting a reference signal for a group of cycles including the first cycle. The group of cycles may correspond, for example, to a subset of a plurality of cycles (e.g., a number of consecutive cycles in the plurality of cycles).

In some examples, the first mobile network entity 904 may sense the first occasion for one or more cycles to determine whether the first occasion is available for use by the first mobile network entity 904 (e.g., the first occasion may be considered available in response to the first occasion not being in use by another neighbor network entity). The first mobile network entity 904 may then select the first occasion to transmit a reference signal in response to determining that the first occasion is available.

In some examples, the first mobile network entity 904 may transmit the reference signal using a first transmit beam. In some examples, the first mobile network entity 904 may use a different respective transmit beam of a plurality of transmit beams on the first mobile network entity 904 (e.g., as shown in FIG. 6) for each cycle or each group of multiple cycles (e.g., a subset of a plurality of cycles) to transmit a reference signal. For example, the first mobile network entity 904 may transmit the reference signal using the first transmit beam in a first cycle (e.g., a first window of the first cycle), and may then transmit the reference signal using a second transmit beam in a second window of a second cycle. As another example, the first mobile network entity 904 may transmit the reference signal using the first transmit beam in a first group (or subset) of cycles (e.g., within a respective window of each of the cycles in the first group of cycles), and then transmit the reference signal using the second transmit beam in a second group (or subset) of cycles.

Similarly, the second mobile network entity 906 may receive the reference signal from the first mobile network entity 904 using a receive beam. In some examples, the second mobile network entity 906 may use a different respective receive beam of a plurality of receive beams on the second mobile network entity 906 (e.g., as shown in FIG. 6) for each cycle or each group of multiple cycles (e.g., a subset of a plurality of cycles) to receive a reference signal from the first mobile network entity 904.

At 914, the second mobile network entity 906 may obtain a CLI measurement based on the reference signal. For example, the second mobile network entity 906 may obtain a reference signal received power (RSRP) or signal-to-interference-plus-noise ratio (SINR) of the reference signal. At 914, the second mobile network entity 906 may then transmit a CLI measurement report including the CLI measurement to the central network entity 902. In some examples, the second mobile network entity 906 may transmit the CLI measurement report in response to the CLI measurement being greater than a threshold (e.g., indicating that the CLI may prevent the second mobile network entity 906 from decoding an uplink transmission from a UE or child IAB node).

At 916, the second mobile network entity 906 may select a second occasion from the plurality of occasions and transmit a reference signal (e.g., an SSB) within the selected first occasion. In some examples, the second mobile network entity 906 may select the first occasion randomly per cycle or per a group of cycles. As another example, the second mobile network entity 906 may sense the second occasion for one or more cycles to determine whether the first occasion is available for use by the second mobile network entity 906 prior to selecting the second occasion (e.g., whether the first occasion is not being used by another network entity to transmit reference signals). The first mobile network entity 904 may listen during the second occasion in order to receive the referenced signal from the second mobile network entity 906. For example, at 910, the first mobile network entity may select occasion 1 to transmit a reference signal and may then listen to the remaining N−1 occasions for reference signals from other neighbor mobile network entities. Similarly, the second mobile network entity 906 may select occasion 2 to transmit a reference signal and may then listen to occasion 1 and the remaining N−2 occasions for reference signals from other neighbor mobile network entities.

The second mobile network entity 906 may further transmit the reference signal using a selected transmit beam on the second mobile network entity. In addition, the first mobile network entity 904 may receive the reference signal from the second mobile network entity using a selected receive beam on the first mobile network entity 904. The transmit beams and receive beams may vary per cycle or per group of multiple cycles.

At 918, the first mobile network entity 904 may obtain a CLI measurement (e.g., RSRP or SINR) based on the reference signal. At 920, the first mobile network entity 904 may then transmit a CLI measurement report including the CLI measurement to the central network entity 902. In some examples, the first mobile network entity 904 may transmit the CLI measurement report in response to the CLI measurement being greater than a threshold. The threshold may be preconfigured on the mobile network entities 904 and 906 or provided by the central network entity 902.

In some examples, each of the first mobile network entity 904 and second mobile network entity 906 may be configured with a different window periodicity based on a common window periodicity of the respective windows of the one or more cycles indicated by the common window configuration. For example, the central network entity may configure the common window configuration with a common window periodicity. Each mobile network entity may use either the common window periodicity or a multiple of the common window periodicity for transmission of reference signals. For example, the common window periodicity may be K ms, the first mobile network entity 904 may use a window periodicity of 2K ms, and the second mobile network entity 906 may use a window periodicity of 3K ms. By allocating different periodicities to different mobile network entities, the number of mobile network entities using the common window configuration may be increased and/or the potential for reference signal collision between the mobile network entities may be minimized. In some examples, the mobile network entities may determine their respective periodicities based on one or more factors (e.g., velocity of the mobile network entities, a rule defined in a 3GPP standard or specification, etc.). In this example, the mobile network entities may provide their respective window periodicities to other neighbor mobile network entities or the mobile network entities may sense the respective window periodicities. In other examples, the central network entity may configure the respective window periodicity for each mobile network entity and explicitly indicate the window periodicity to the respective mobile network entity or to the respective mobile network entity and one or more neighbor network entities.

Figure 10:
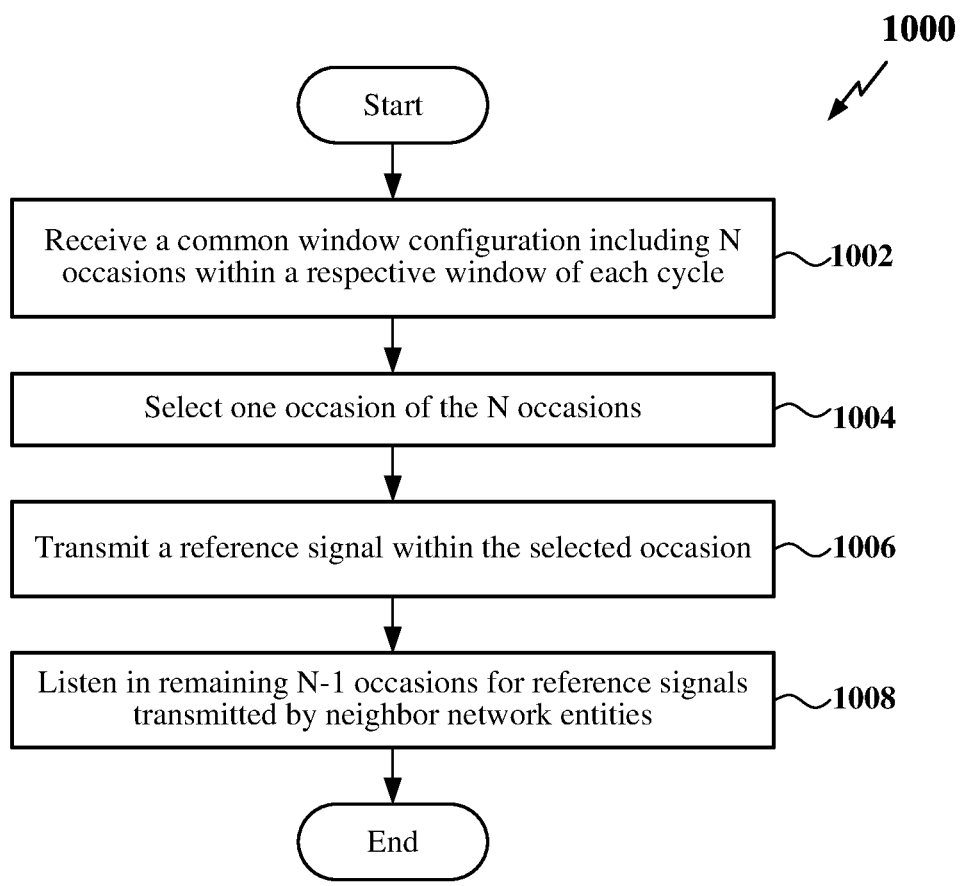
FIG. 10 is a flow chart illustrating an exemplary process for CLI measurement using a common window configuration according to some aspects.

FIG. 10 is a flow chart illustrating an exemplary process 1000 for CLI measurement using a common window configuration according to some aspects. As described below, some or all illustrated features may be omitted in a particular implementation within the scope of the present disclosure, and some illustrated features may not be required for implementation of all embodiments. In some examples, the process 1000 may be carried out by the network entity 1800 (e.g., a mobile network entity) illustrated in FIG. 18. In some examples, the process 1000 may be carried out by any suitable apparatus or means for carrying out the functions or algorithm described below.

At block 1002, the mobile network entity may receive a common window configuration for mobile network entities including a plurality of (e.g., N) occasions within a respective window of each cycle of one or more cycles. The mobile network entity may receive the common window configuration from a central network entity. In some examples, the common window configuration may be periodic, aperiodic, semi-persistent, or event-triggered.

At block 1004, the mobile network entity may select one occasion of the N occasions (e.g., a first occasion) to transmit a reference signal. For example, the mobile network entity may randomly select the occasion from the plurality of occasions to transmit the reference signal. In some examples, the mobile network entity may use the selected occasion to transmit a reference signal within each of the one or more cycles or within a subset of the one or more cycles. In some examples, the mobile network entity may sense the occasion for at least one cycle of the one or more cycles to determine whether the occasion is available and may select the occasion to transmit the reference signal in response to determining that the occasion is available.

At block 1006, the mobile network entity may then transmit a reference signal (e.g., an SSB) within the selected occasion (e.g., the first occasion). In some examples, the mobile network entity may transmit the reference signal using a transmit beam. In some examples, the mobile network entity may transmit the reference signal using a different respective transmit beam of a plurality of transmit beams of the mobile network entity for each cycle of the one or more cycles or for each group of multiple cycles of the one or more cycles.

At block 1008, the mobile network entity may listen in the remaining N−1 occasions for reference signals transmitted by neighbor network entities. In some examples, the mobile network entity may listen for additional reference signals from neighbor mobile network entities of the plurality of mobile network entities during remaining occasions of the plurality of occasions of each of the one or more cycles.

Figure 11:
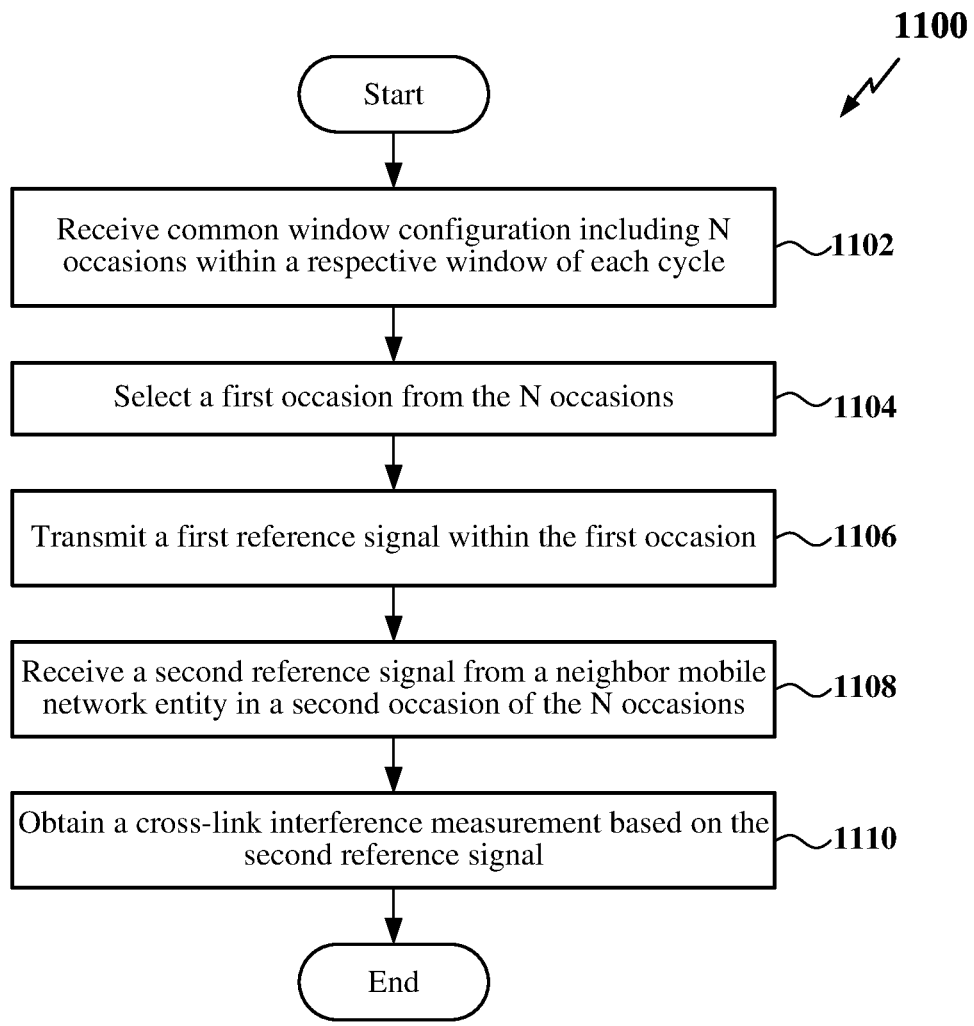
FIG. 11 is a flow chart illustrating another exemplary process for CLI measurement using a common window configuration according to some aspects.

FIG. 11 is a flow chart illustrating another exemplary process 1100 for CLI measurement using a common window configuration according to some aspects. As described below, some or all illustrated features may be omitted in a particular implementation within the scope of the present disclosure, and some illustrated features may not be required for implementation of all embodiments. In some examples, the process 1100 may be carried out by the network entity 1800 (e.g., a mobile network entity) illustrated in FIG. 18. In some examples, the process 1100 may be carried out by any suitable apparatus or means for carrying out the functions or algorithm described below.

At block 1102, the mobile network entity may receive a common window configuration for mobile network entities including a plurality of (e.g., N) occasions within a respective window of each cycle of one or more cycles. The mobile network entity may receive the common window configuration from a central network entity. In some examples, the common window configuration may be periodic, aperiodic, semi-persistent, or event-triggered.

At block 1104, the mobile network entity may select a first occasion from the N occasions to transmit a reference signal. For example, the mobile network entity may randomly select the first occasion from the plurality of occasions to transmit the reference signal. In some examples, the mobile network entity may use the selected first occasion to transmit a reference signal within each of the one or more cycles or within a subset of the one or more cycles. In some examples, the mobile network entity may sense the first occasion for at least one cycle of the one or more cycles to determine whether the first occasion is available and may select the first occasion to transmit the reference signal in response to determining that the first occasion is available.

At block 1106, the mobile network entity may then transmit a first reference signal (e.g., an SSB) within the selected first occasion. In some examples, the mobile network entity may transmit the first reference signal using a transmit beam. In some examples, the mobile network entity may transmit the first reference signal using a different respective transmit beam of a plurality of transmit beams of the mobile network entity for each cycle of the one or more cycles or for each group of multiple cycles of the one or more cycles.

At block 1008, the mobile network entity may receive a second reference signal from a neighbor mobile network entity in a second occasion of the N occasions. In some examples, the mobile network entity may receive the second reference signal using a receive beam. In some examples, the mobile network entity may receive the second reference signal using a different respective receive beam of a plurality of receive beams of the mobile network entity for each cycle of the one or more cycles or for each group of multiple cycles of the one or more cycles.

At block 1110, the mobile network entity may obtain a cross-link interference (CLI) measurement indicating the CLI between the mobile network entity and the neighbor mobile network entity based on the second reference signal. For example, the CLI measurement may be an RSRP or SINR measurement. In some examples, the mobile network entity may further transmit a CLI measurement report to the central network entity including the CLI measurement (e.g., when the CLI measurement is greater than a threshold). In other examples, the mobile network entity may utilize the CLI measurement to perform CLI mitigation techniques (e.g., by selecting a transmit/receive beam that has the lowest CLI) to reduce the CLI between the mobile network entity and the neighbor mobile network entity.

Figure 12:
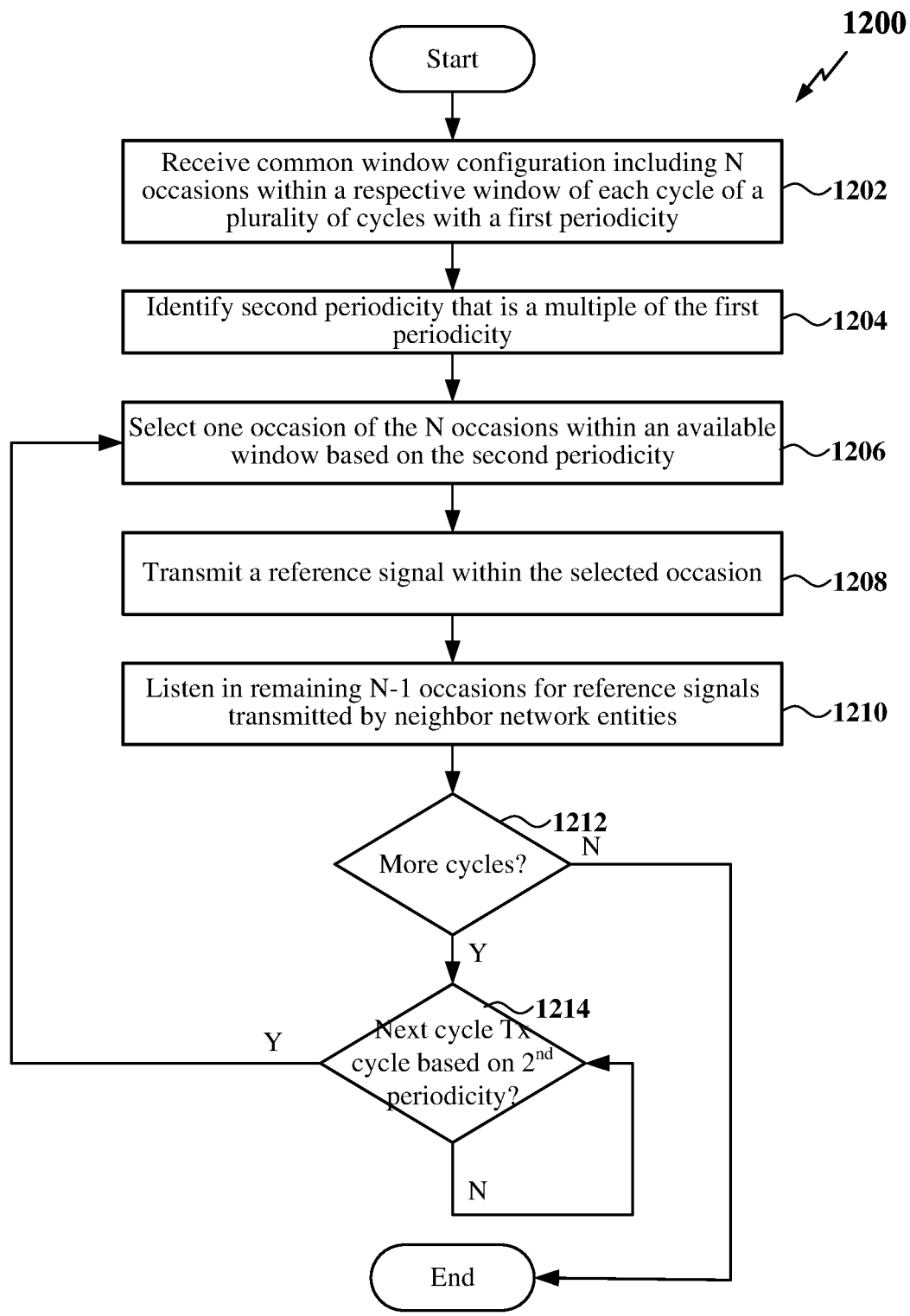
FIG. 12 is a flow chart illustrating another exemplary process for CLI measurement using a common window configuration according to some aspects.

FIG. 12 is a flow chart illustrating another exemplary process 1200 for CLI measurement using a common window configuration according to some aspects. As described below, some or all illustrated features may be omitted in a particular implementation within the scope of the present disclosure, and some illustrated features may not be required for implementation of all embodiments. In some examples, the process 1200 may be carried out by the network entity 1800 (e.g., a mobile network entity) illustrated in FIG. 18. In some examples, the process 1200 may be carried out by any suitable apparatus or means for carrying out the functions or algorithm described below.

At block 1202, the mobile network entity may receive a common window configuration for mobile network entities including a plurality of (e.g., N) occasions within a respective window of each cycle of a plurality of cycles with a first periodicity of the respective windows of the one or more cycles. The network entity may receive the common window configuration from a central network entity. In some examples, the common window configuration may be periodic, aperiodic, semi-persistent, or event-triggered.

At block 1204, the mobile network entity may identify a second periodicity that is a multiple of the first periodicity for transmission of reference signals. For example, the central network entity may configure the common window configuration with the first periodicity of K ms. The mobile network entity may identify the second window periodicity as M*K, where M is greater than one. In some examples, the mobile network entity may determine the second periodicity based on a velocity of the mobile network entity. For example, if the mobile network entity is traveling at a high velocity, the mobile network entity may select a low value of M to produce a more frequent window periodicity (e.g., second periodicity), whereas if the mobile network entity is traveling at a low velocity, the mobile network entity may select a high value of M to produce a less frequent window periodicity (e.g., second periodicity). In some examples, the mobile network entity may select the second periodicity based on an OEM configuration (e.g., based on one or more standards or specifications) or based on an explicit indication received by the mobile network entity (e.g., from the central network entity) of the second periodicity.

At block 1206, the mobile network entity may select one occasion of the N occasions within an available window based on the second periodicity to transmit a reference signal. For example, the mobile network entity may use a window every M*K ms to select an occasion. In some examples, the mobile network entity may randomly select the occasion from the plurality of occasions within the available window to transmit the reference signal. In some examples, the mobile network entity may use the selected occasion to transmit a reference signal within each available window based on the second periodicity or within a subset of the available windows. In some examples, the mobile network entity may sense the occasion for at least one window based on the second periodicity to determine whether the occasion is available and may select the occasion to transmit the reference signal in response to determining that the occasion is available.

At block 1208, the mobile network entity may then transmit a reference signal (e.g., an SSB) within the selected occasion. In some examples, the mobile network entity may transmit the reference signal using a transmit beam. At 1210, the mobile network entity may listen in the remaining N−1 occasions for reference signals transmitted by neighbor network entities. The mobile network entity may further listen and receive reference signals transmitted by neighbor network entities based on the respective periodicity of each of the other neighbor network entities. For example, a neighbor network entity may be configured with a third window periodicity of L*K, where L is greater than one and is the same as or different than M. In some examples, the network entity may receive the third window periodicity of the neighbor network entity from the central network entity or from the neighbor network entity itself.

At 1212, the mobile network entity may determine whether there are more cycles of the one or more cycles (e.g., based on the common window configuration being periodic, aperiodic, semi-persistent, or event-triggered). If there are more cycles of the one or more cycles, (Y branch of block 1212), at block 1214, the mobile network entity may determine whether the next cycle is a transmit cycle within which the mobile network entity may transmit a reference signal based on the second periodicity. If the next cycle is a transmit cycle (Y branch of block 1214), the mobile network entity may select one occasion of the N occasions to transmit the reference signal in the next cycle (e.g., the respective window of the next cycle). In some examples, the selected occasion may be the same occasion or may be a different occasion. In addition, the mobile network entity may select a transmit beam for transmission of the reference signal. In some examples, the transmit beam may be the same transmit beam or a different transmit beam.

Figure 13:
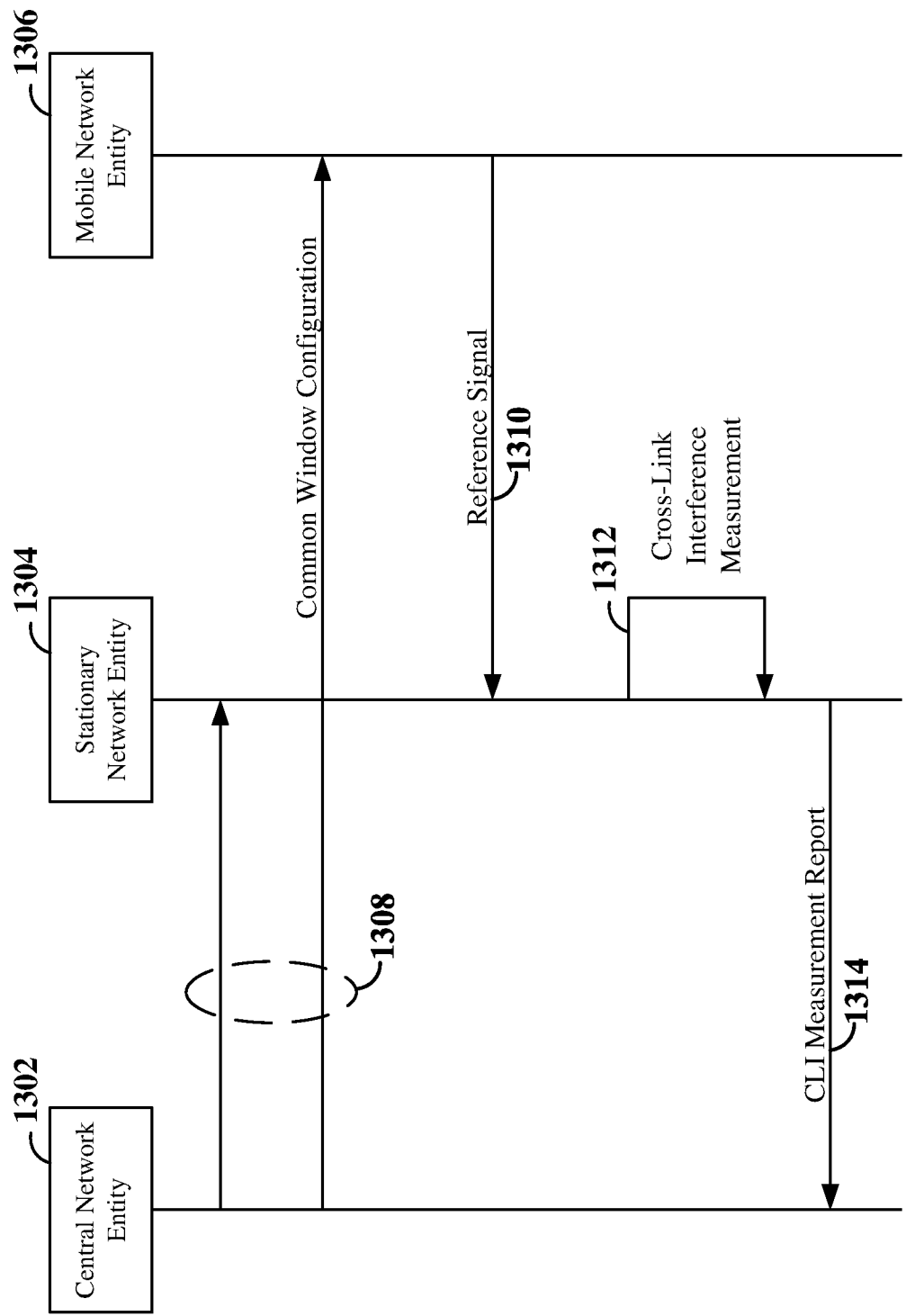
FIG. 13 is a signaling diagram illustrating exemplary signaling for CLI measurement at a stationary network entity using a common window configuration according to some aspects.

FIG. 13 is a signaling diagram illustrating exemplary signaling between a central network entity 1302, a stationary network entity 1304, and a mobile network entity 1306 for CLI measurement at a stationary network entity 1304 using a common window configuration according to some aspects. The central network entity 1302 may correspond, for example, to the CU or real-time or non-real-time intelligent controller shown in FIG. 4 or to the CU shown in FIG. 5. The central network entity 1302 may further correspond to a core network node, such as an OAM function. Each of the stationary network entity 1304 and mobile network entity 1306 may be aggregated or disaggregated network entities (e.g., may include one or more entities of a disaggregated base station) and/or may be IAB nodes.

At 1308, the central network entity 1302 may provide a common window configuration for mobile network entities (e.g., mobile network entity 1306) to communicate reference signals for CLI measurement and reporting. The common window configuration may include, for example, a plurality of occasions (e.g., N occasions) within each respective window of one or more cycles on which reference signals (e.g., SSBs) may be sent/received. In addition, the common window configuration may be periodic, aperiodic, semi-persistent, or event-triggered.

At 1310, the mobile network entity 1306 may select an occasion from the plurality of occasions and transmit a reference signal (e.g., an SSB) within the selected occasion. In some examples, the mobile network entity 1306 may select the first occasion randomly per cycle or per a group of cycles. In some examples, the mobile network entity 1306 may sense the occasion for one or more cycles to determine whether the occasion is available and then select the occasion to transmit the reference signal in response to determining that the first occasion is available. In some examples, the mobile network entity 1306 may transmit the reference signal using a first transmit beam. In some examples, the mobile network entity 1306 may use a different respective transmit beam of a plurality of transmit beams on the mobile network entity 1306 (e.g., as shown in FIG. 6) for each cycle or each group of multiple cycles (e.g., a subset of a plurality of cycles) to transmit the reference signal.

Similarly, the stationary network entity 1304 may receive the reference signal from the mobile network entity 1306 using a receive beam. In some examples, the stationary network entity 1304 may use a different respective receive beam of a plurality of receive beams on the stationary network entity 1304 (e.g., as shown in FIG. 6) for each cycle or each group of multiple cycles (e.g., a subset of a plurality of cycles) to receive a reference signal from the mobile network entity 1306.

At 1312, the stationary network entity 1304 may obtain a CLI measurement based on the reference signal. For example, the stationary network entity 1304 may obtain a reference signal received power (RSRP) or signal-to-interference-plus-noise ratio (SINR) of the reference signal. At 1314, the stationary network entity 1304 may then transmit a CLI measurement report including the CLI measurement to the central network entity 1302. In some examples, the stationary network entity 1304 may transmit the CLI measurement report in response to the CLI measurement being greater than a threshold.

Figure 14:
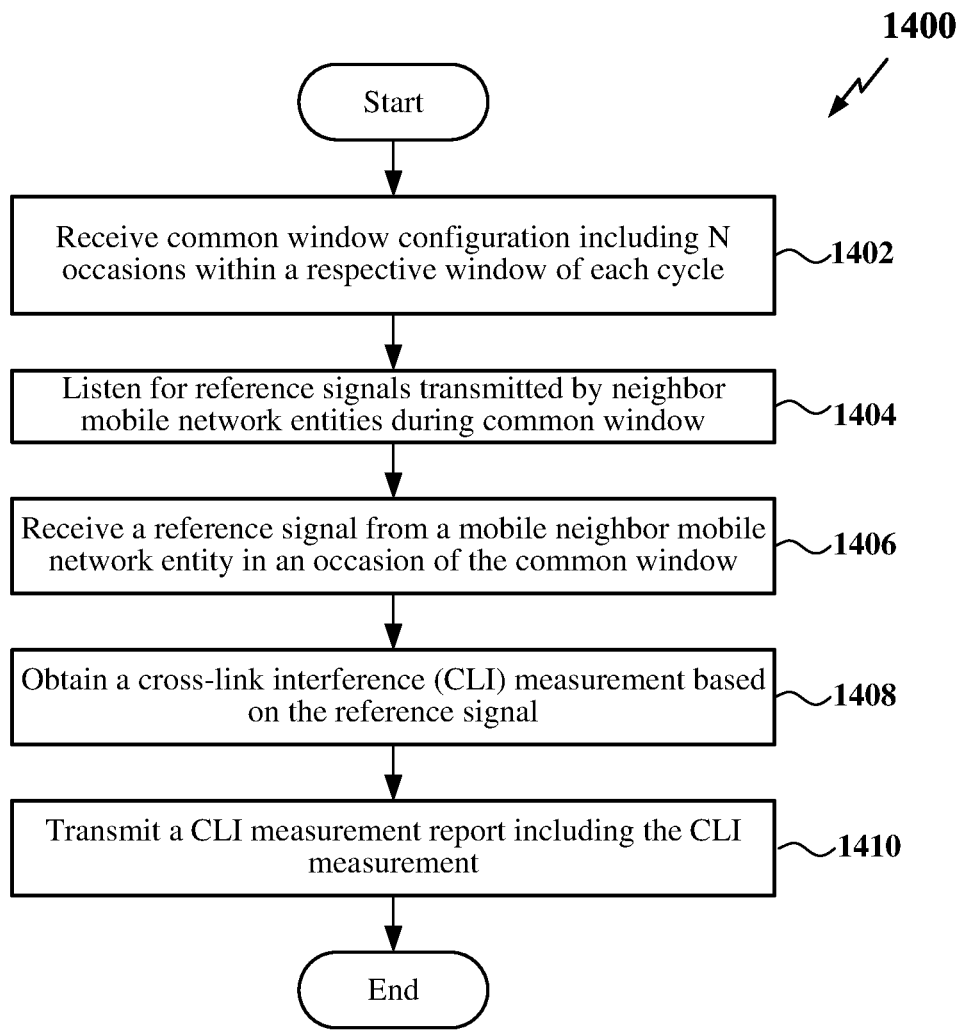
FIG. 14 is a flow chart illustrating an exemplary process for CLI measurement at a stationary network entity using a common window configuration according to some aspects.

FIG. 14 is a flow chart illustrating an exemplary process 1400 for CLI measurement at a stationary network entity using a common window configuration transmission according to some aspects. As described below, some or all illustrated features may be omitted in a particular implementation within the scope of the present disclosure, and some illustrated features may not be required for implementation of all embodiments. In some examples, the process 1400 may be carried out by the network entity 1800 (e.g., a mobile network entity) illustrated in FIG. 18. In some examples, the process 1400 may be carried out by any suitable apparatus or means for carrying out the functions or algorithm described below.

At block 1402, the stationary network entity may receive a common window configuration for mobile network entities including a plurality of (e.g., N) occasions within a respective window of each cycle of one or more cycles. The stationary network entity may receive the common window configuration from a central network entity. In some examples, the common window configuration may be periodic, aperiodic, semi-persistent, or event-triggered.

At block 1404, the stationary network entity may listen for reference signals transmitted by neighbor network entities during the common window. In some examples, the stationary network entity may listen to the respective window of each of the one or more cycles. For example, the stationary network entity may listen in in each of the N occasions during each of the common windows. In other examples, the common window configuration may include a first periodicity of the respective windows of the one or more cycles (e.g., a window periodicity corresponding to a cycle duration) and a neighbor mobile network entity may be configured with a second periodicity that is a multiple of the first periodicity. In this example, the stationary network entity may listen to the respective window within select cycles of the one or more cycles based on the second periodicity associated with the one or more cycles that is used by the neighbor mobile network entity for transmission of reference signals. In some examples, the stationary network entity may receive the second periodicity from the central network entity. In other examples, the stationary network entity may receive the second periodicity from the neighbor mobile network entity. If there are multiple neighbor mobile network entities, the stationary network entity may listen to the respective windows within select cycles based on the respective second periodicity associated with each of the neighbor mobile network entities.

At block 1406, the stationary network entity may receive a reference signal from a neighbor mobile network entity (e.g., within an occasion of a window listened to by the stationary network entity). In some examples, the stationary network entity may receive the reference signal using a receive beam. In some examples, the stationary network entity may receive the reference signal using a different respective receive beam of a plurality of receive beams of the stationary network entity for each cycle of the one or more cycles (e.g., based on the first periodicity or the second periodicity) or for each group of multiple cycles of the one or more cycles.

At block 1408, the stationary network entity may obtain a cross-link interference (CLI) measurement indicating the CLI between the stationary network entity and the neighbor mobile network entity based on the received reference signal. For example, the CLI measurement may be an RSRP or SINR measurement. At block 1410, the stationary network entity may further transmit a CLI measurement report to the central network entity including the CLI measurement. In some examples, the stationary network entity may transmit the CLI measurement report in response to the CLI measurement being greater than a threshold.

Figure 15:
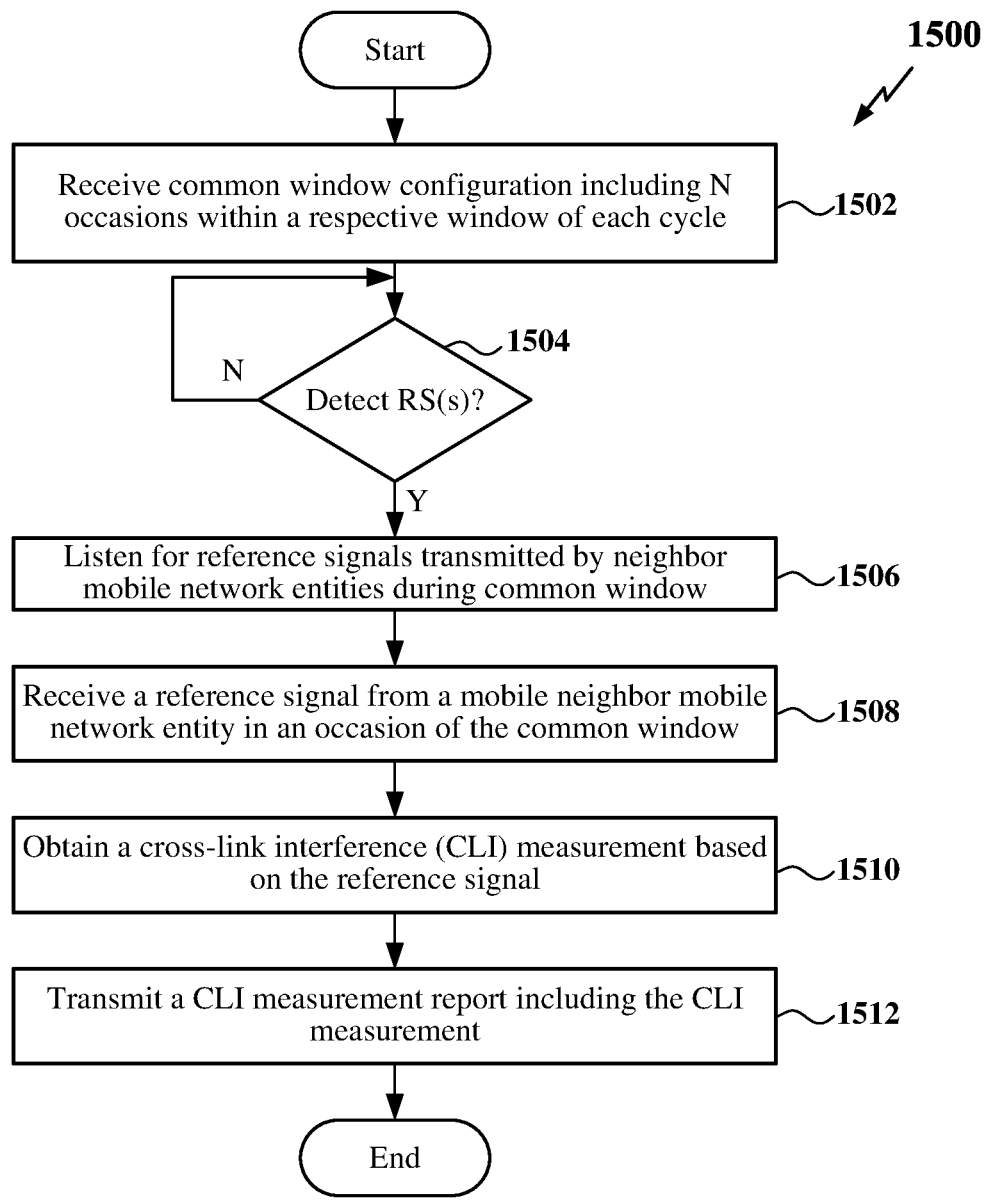
FIG. 15 is a flow chart illustrating another exemplary process for CLI measurement at a stationary network entity using a common window configuration according to some aspects.

FIG. 15 is a flow chart illustrating an exemplary process 1500 for CLI measurement at a stationary network entity using a common window configuration transmission according to some aspects. As described below, some or all illustrated features may be omitted in a particular implementation within the scope of the present disclosure, and some illustrated features may not be required for implementation of all embodiments. In some examples, the process 1500 may be carried out by the network entity 1800 (e.g., a mobile network entity) illustrated in FIG. 18. In some examples, the process 1500 may be carried out by any suitable apparatus or means for carrying out the functions or algorithm described below.

At block 1502, the stationary network entity may receive a common window configuration for mobile network entities including a plurality of (e.g., N) occasions within a respective window of each cycle of one or more cycles. The stationary network entity may receive the common window configuration from a central network entity. In some examples, the common window configuration may be periodic, aperiodic, semi-persistent, or event-triggered.

At block 1504, the stationary network entity may determine whether the stationary network entity has detected one or more reference signals transmitted by neighbor mobile network entities during the common window. For example, the stationary network entity may be an IAB node with an MT functionality or a stationary network entity with a UE functionality that can detect reference signals (e.g., SSBs) from neighbor network entities.

At block 1506, in response to detecting one or more reference signals transmitted by neighbor mobile network entities during the common window, the stationary network entity may listen for reference signals transmitted by neighbor network entities during the common window. In some examples, the stationary network entity may listen to the respective window of each of the one or more cycles after detecting the reference signals. For example, the stationary network entity may listen in in each of the N occasions during each of the common windows. In other examples, the common window configuration may include a first periodicity of the respective windows of the one or more cycles (e.g., a window periodicity corresponding to a cycle duration) and a neighbor mobile network entity may be configured with a second periodicity that is a multiple of the first periodicity. In this example, the stationary network entity may listen to the respective window within select cycles of the one or more cycles based on the second periodicity associated with the one or more cycles that is used by the neighbor mobile network entity for transmission of reference signals. In some examples, the stationary network entity may receive the second periodicity from the central network entity. In other examples, the stationary network entity may receive the second periodicity from the neighbor mobile network entity. If there are multiple neighbor mobile network entities, the stationary network entity may listen to the respective windows within select cycles based on the respective second periodicity associated with each of the neighbor mobile network entities.

At block 1508, the stationary network entity may receive a reference signal from a neighbor mobile network entity (e.g., within an occasion of a window listened to by the stationary network entity). In some examples, the stationary network entity may receive the reference signal using a receive beam. In some examples, the stationary network entity may receive the reference signal using a different respective receive beam of a plurality of receive beams of the stationary network entity for each cycle of the one or more cycles (e.g., based on the first periodicity or the second periodicity) or for each group of multiple cycles of the one or more cycles.

At block 1510, the stationary network entity may obtain a cross-link interference (CLI) measurement indicating the CLI between the stationary network entity and the neighbor mobile network entity based on the received reference signal. For example, the CLI measurement may be an RSRP or SINR measurement. At block 1512, the stationary network entity may further transmit a CLI measurement report to the central network entity including the CLI measurement. In some examples, the stationary network entity may transmit the CLI measurement report in response to the CLI measurement being greater than a threshold.

Figure 16:
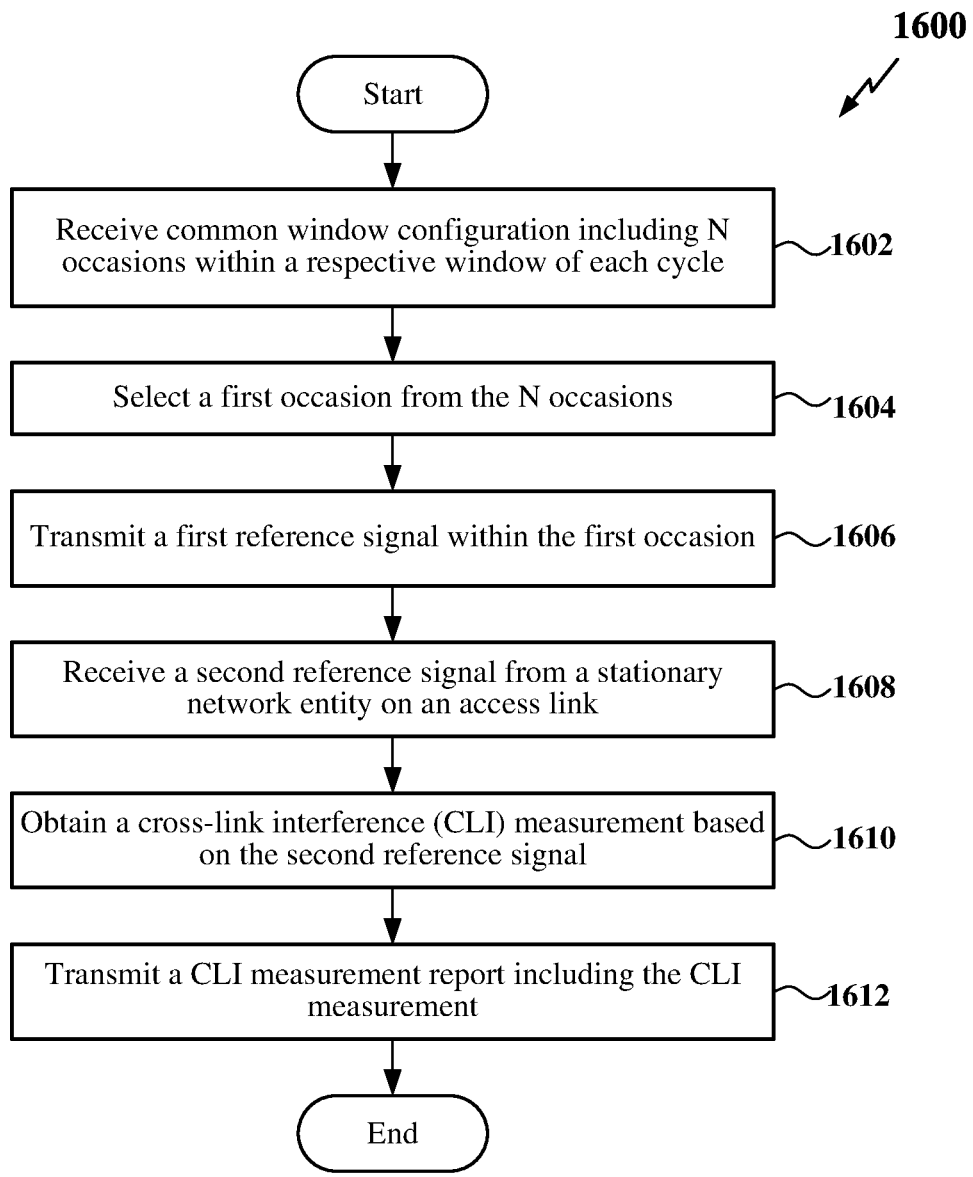
FIG. 16 is a flow chart illustrating an exemplary process for CLI measurement between a stationary network entity and a mobile network entity according to some aspects.

FIG. 16 is a flow chart illustrating an exemplary process 1600 for CLI measurement between a stationary network entity and a mobile network entity according to some aspects. As described below, some or all illustrated features may be omitted in a particular implementation within the scope of the present disclosure, and some illustrated features may not be required for implementation of all embodiments. In some examples, the process 1600 may be carried out by the network entity 1800 (e.g., a mobile network entity) illustrated in FIG. 18. In some examples, the process 1600 may be carried out by any suitable apparatus or means for carrying out the functions or algorithm described below.

At block 1602, the mobile network entity may receive a common window configuration for mobile network entities including a plurality of (e.g., N) occasions within a respective window of each cycle of one or more cycles. The mobile network entity may receive the common window configuration from a central network entity. In some examples, the common window configuration may be periodic, aperiodic, semi-persistent, or event-triggered.

At block 1604, the mobile network entity may select a first occasion from the N occasions to transmit a reference signal. For example, the mobile network entity may randomly select the first occasion from the plurality of occasions to transmit the reference signal. In some examples, the mobile network entity may use the selected first occasion to transmit a reference signal within each of the one or more cycles or within a subset of the one or more cycles. In some examples, the mobile network entity may sense the first occasion for at least one cycle of the one or more cycles to determine whether the first occasion is available and may select the first occasion to transmit the reference signal in response to determining that the first occasion is available.

At block 1606, the mobile network entity may then transmit a first reference signal (e.g., an SSB) within the selected first occasion. In some examples, the mobile network entity may transmit the first reference signal using a transmit beam. In some examples, the mobile network entity may transmit the first reference signal using a different respective transmit beam of a plurality of transmit beams of the mobile network entity for each cycle of the one or more cycles or for each group of multiple cycles of the one or more cycles. In some examples, the first reference signal may be received, for example, by one or more neighbor network entities (e.g., stationary network entities and/or mobile network entities) for measurement of the CLI between the mobile network entity and the neighbor network entities based on the first reference signal.

At block 1608, the mobile network entity may further be configured to receive a second reference signal from a stationary network entity on an access link. For example, the mobile network entity may be an IAB node with an MT unit or a mobile network entity with a UE functionality. In this example, the mobile network entity may utilize the SMTC window configured for the access link (e.g., aligned to SSB transmissions on the access link between the stationary network entity and one or more UEs) to receive the second reference signal from the neighbor stationary network entity.

At block 1610, the mobile network entity may obtain a cross-link interference (CLI) measurement indicating the CLI between the mobile network entity and the neighbor stationary network entity based on the second reference signal. For example, the CLI measurement may be an RSRP or SINR measurement. At block 1612, the mobile network entity may further transmit a CLI measurement report to the central network entity including the CLI measurement (e.g., when the CLI measurement is greater than a threshold).

In some examples, in addition to or in alternative to the access link CLI measurement, a mobile network entity may need to measure additional preconfigured inter-network entity CLI reference signals of stationary network entities. In this example, an individual window configuration for a stationary network entity may be configured (e.g., by the central network entity) and provided to the mobile network entity by the central network entity or the stationary network entity (e.g., the stationary network entity may broadcast the individual window configuration of the stationary network entity).

Figure 17:
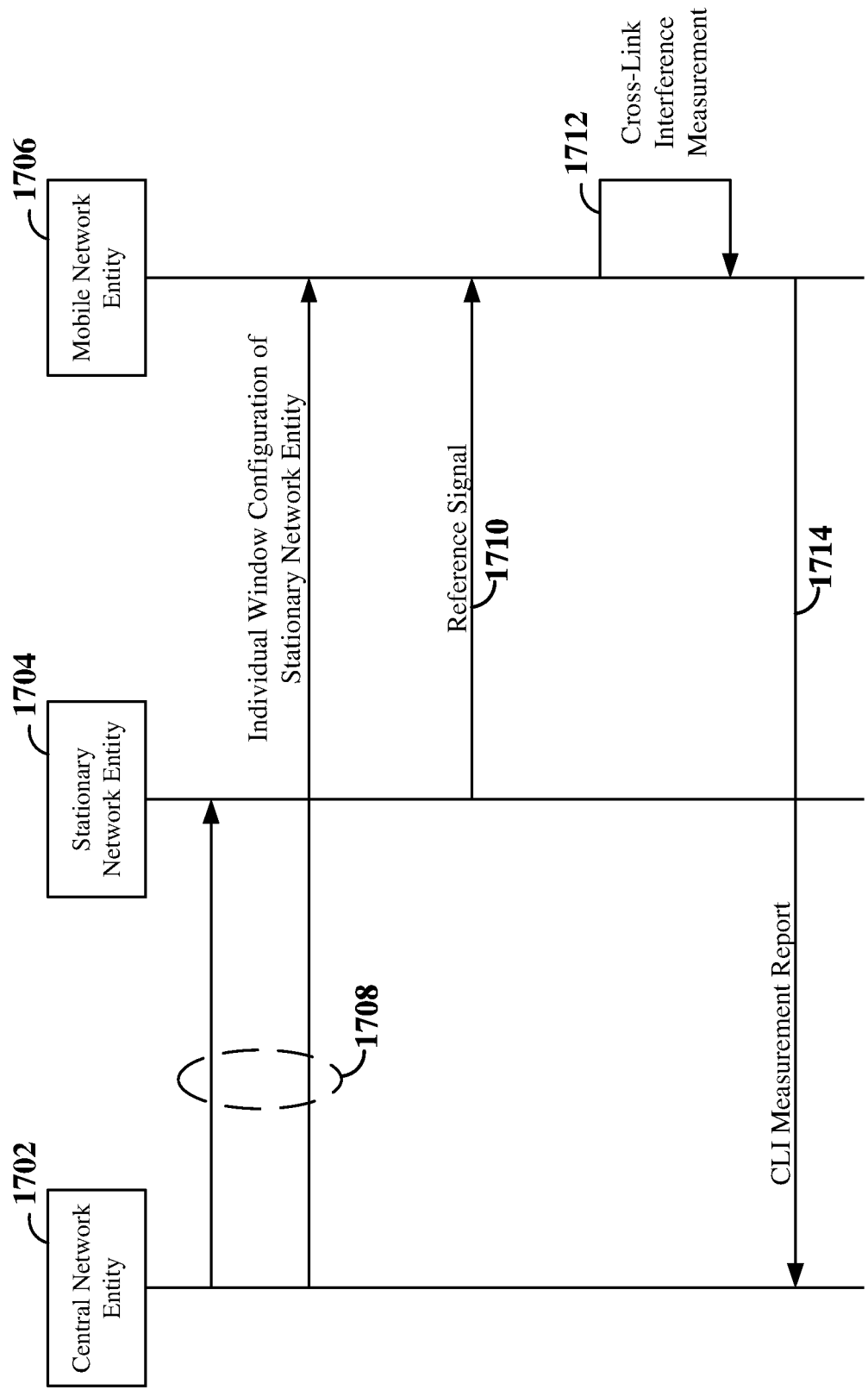
FIG. 17 is a signaling diagram illustrating exemplary signaling for CLI measurement between a mobile network entity and a stationary network entity using an individual window configuration according to some aspects.

FIG. 17 is a signaling diagram illustrating exemplary signaling between a central network entity 1702, a stationary network entity 1704, and a mobile network entity 1706 for CLI measurement between the mobile network entity 1706 and the stationary network entity 1704 using an individual window configuration according to some aspects. The central network entity 1702 may correspond, for example, to the CU or real-time or non-real-time intelligent controller shown in FIG. 4 or to the CU shown in FIG. 5. The central network entity 1702 may further correspond to a core network node, such as an OAM function. Each of the stationary network entity 1704 and mobile network entity 1706 may be aggregated or disaggregated network entities (e.g., may include one or more entities of a disaggregated base station) and/or may be IAB nodes.

At 1708, the central network entity 1702 may provide an individual window configuration for the stationary network entity 1704 to communicate reference signals for CLI measurement and reporting. The individual window configuration may be similar to an STC/SMTC window configuration for the access link but configured for the stationary network entity 1704 for the purpose of CLI measurements by neighbor mobile network entities. For example, the individual window configuration may include different CLI measurement resources than the STC/SMTC window configuration for the access link and/or a different periodicity than the STC/SMTC window configuration for the access link. The central network entity 1702 may provide the individual window configuration to both the stationary network entity 1704 and neighbor mobile network entities. In other examples, the stationary network entity 1704 may provide (e.g., broadcast) the individual window configuration to the mobile network entity 1706.

At 1710, the stationary network entity 1704 may transmit a reference signal (e.g., an SSB) based on the individual window configuration. In some examples, the stationary network entity 1704 may transmit an SSB burst set within a window of the individual window configuration.

At 1712, the mobile network entity 1706 may obtain a CLI measurement indicating the CLI between the mobile network entity 1706 and the stationary network entity 1704 based on the reference signal. For example, the mobile network entity 1706 may obtain a reference signal received power (RSRP) or signal-to-interference-plus-noise ratio (SINR) of the reference signal. At 1714, the mobile network entity 1706 may then transmit a CLI measurement report including the CLI measurement to the central network entity 1702. In some examples, the mobile network entity 1706 may transmit the CLI measurement report in response to the CLI measurement being greater than a threshold.

Figure 18:
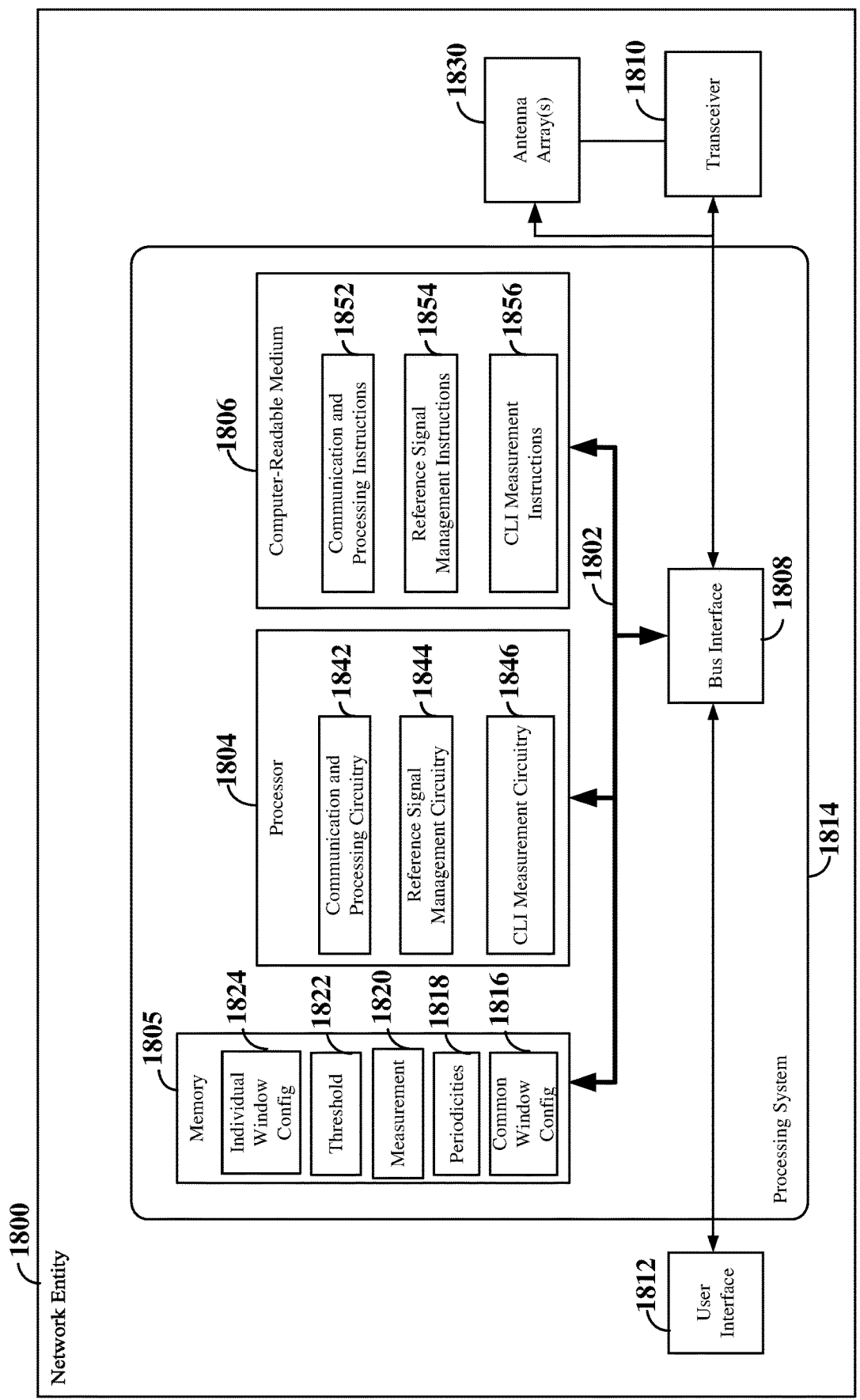
FIG. 18 is a block diagram illustrating an example of a hardware implementation for a network entity employing a processing system according to some aspects.

FIG. 18 is a block diagram illustrating an example of a hardware implementation of a network entity 1800 employing a processing system 1814 according to some aspects. The network entity 1800 may be, for example, any base station (e.g., gNB, eNB) or other scheduling entity as illustrated in any one or more of FIGS. 1, 2, 4-8A, 9, 13, and/or 17. The network entity 1800 may further be implemented in an aggregated or monolithic base station architecture, or in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. In addition, the network entity 1800 may be a stationary network entity or a mobile network entity.

In accordance with various aspects of the disclosure, an element, or any portion of an element, or any combination of elements may be implemented with a processing system 1814 that includes one or more processors, such as processor 1804. Examples of processors 1804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the network entity 1800 may be configured to perform any one or more of the functions described herein. That is, the processor 1804, as utilized in the network entity 1800, may be used to implement any one or more of the methods or processes described and illustrated, for example, in FIGS. 9-17 and/or 19.

The processor 1804 may in some instances be implemented via a baseband or modem chip and in other implementations, the processor 1804 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1814 may be implemented with a bus architecture, represented generally by the bus 1802. The bus 1802 may include any number of interconnecting buses and bridges depending on the specific application of the processing system 1814 and the overall design constraints. The bus 1802 communicatively couples together various circuits, including one or more processors (represented generally by the processor 1804), a memory 1805, and computer-readable media (represented generally by the computer-readable medium 1806). The bus 1802 may also link various other circuits such as timing sources, peripherals, voltage regulators, and power management circuits, which are well known in the art, and therefore, are not described any further.

A bus interface 1808 provides an interface between the bus 1802, a transceiver 1810, and one or more antenna arrays 1830 (e.g., one or more antenna panels). The transceiver 1810 may be, for example, a wireless transceiver. The transceiver 1810 provides a means for communicating with various other apparatus over a transmission medium (e.g., air interface). The transceiver 1810 may further be coupled to the antenna array(s) for beamforming. The bus interface 1808 further provides an interface between the bus 1802 and a user interface 1812 (e.g., keypad, display, touch screen, speaker, microphone, control features, etc.). Of course, such a user interface 1812 may be omitted in some examples.

The computer-readable medium 1806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1806 may reside in the processing system 1814, external to the processing system 1814, or distributed across multiple entities including the processing system 1814. The computer-readable medium 1806 may be embodied in a computer program product. By way of example, a computer program product may include a computer-readable medium in packaging materials. In some examples, the computer-readable medium 1806 may be part of the memory 1805. Those skilled in the art will recognize how best to implement the described functionality presented throughout this disclosure depending on the particular application and the overall design constraints imposed on the overall system. In some examples, the computer-readable medium 1806 may be implemented on an article of manufacture, which may further include one or more other elements or circuits, such as the processor 1804 and/or memory 1805.

The computer-readable medium 1806 may store computer-executable code (e.g., software). Software shall be construed broadly to mean instructions, instruction sets, code, code segments, program code, programs, subprograms, software modules, applications, software applications, software packages, routines, subroutines, objects, executables, threads of execution, procedures/processes, functions, etc., whether referred to as software, firmware, middleware, microcode, hardware description language, or otherwise.

One or more processors, such as processor 1804, may be responsible for managing the bus 1802 and general processing, including the execution of the software (e.g., instructions or computer-executable code) stored on the computer-readable medium 1806. The software, when executed by the processor 1804, causes the processing system 1814 to perform the various processes and functions described herein for any particular apparatus. The computer-readable medium 1806 and/or the memory 1805 may also be used for storing data that may be manipulated by the processor 1804 when executing software. For example, the memory 1805 may store one or more of a common window configuration 1816, one or more periodicities 1818 associated with the common window configuration 1816, a measurement (e.g., a CLI measurement) 1820, a threshold 1822, and an individual window configuration 1824.

In some aspects of the disclosure, the processor 1804 may include circuitry configured for various functions. For example, the processor 1804 may include communication and processing circuitry 1842 configured to communicate with one or more UEs and/or one or more neighbor network entities. In addition, the communication and processing circuitry 1842 may be configured to communicate with a central network entity (e.g., CU, real-time or non-real-time intelligent controller or core network node) via a midhaul link and/or backhaul link. In some examples, the communication and processing circuitry 1842 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1842 may include one or more transmit/receive chains. The communication and processing circuitry 1842 may further be configured to execute communication and processing software 1852 stored on the computer-readable medium 1806 to implement one or more functions described herein.

In some implementations where the communication involves receiving information, the communication and processing circuitry 1842 may obtain information from a component of the network entity 1800 (e.g., from the transceiver 1810 that receives the information via radio frequency signaling or some other type of signaling suitable for the applicable communication medium), process (e.g., decode) the information, and output the processed information. For example, the communication and processing circuitry 1842 may output the information to another component of the processor 1804, to the memory 1805, or to the bus interface 1808. In some examples, the communication and processing circuitry 1842 may receive one or more of signals, messages, other information, or any combination thereof. In some examples, the communication and processing circuitry 1842 may receive information via one or more channels. In some examples, the communication and processing circuitry 1842 may include functionality for a means for receiving. In some examples, the communication and processing circuitry 1842 may include functionality for a means for processing, including a means for demodulating, a means for decoding, etc.

In some implementations where the communication involves sending (e.g., transmitting) information, the communication and processing circuitry 1842 may obtain information (e.g., from another component of the processor 1804, the memory 1805, or the bus interface 1808), process (e.g., modulate, encode, etc.) the information, and output the processed information. For example, the communication and processing circuitry 1842 may output the information to the transceiver 1810 (e.g., that transmits the information via radio frequency signaling or some other type of signaling suitable for the applicable communication medium). In some examples, the communication and processing circuitry 1842 may send one or more of signals, messages, other information, or any combination thereof. In some examples, the communication and processing circuitry 1842 may send information via one or more channels. In some examples, the communication and processing circuitry 1842 may include functionality for a means for sending (e.g., a means for transmitting). In some examples, the communication and processing circuitry 1842 may include functionality for a means for generating, including a means for modulating, a means for encoding, etc.

The communication and processing circuitry 1842 may further be configured to receive a common window configuration 1816 for a plurality of mobile network entities from a central network entity and to store the common window configuration 1816 within, for example, memory 1805. The common window configuration 1816 may include a plurality of occasions within a respective window of each of one or more cycles for communicating one or more reference signals. In addition, the common window configuration 1816 may be periodic, aperiodic, semi-persistent, or event-triggered.

The communication and processing circuitry 1842 may further be configured to receive a first reference signal from another (e.g., a second) network entity within a first occasion of the plurality of occasions, where at least one of the network entity 1800 and the other (second) network entity is one of the plurality of mobile network entities. In addition, the communication and processing circuitry 1842 may be configured to transmit a second reference signal within a second occasion of the plurality of occasions.

In examples in which the network entity 1800 is a mobile network entity, the communication and processing circuitry 1842 may further be configured to listen for additional reference signals from neighbor mobile network entities of the plurality of mobile network entities during remaining occasions (e.g., other than the second occasion) of the plurality of occasions of each of the one or more cycles. In examples in which the network entity 1800 is a stationary network entity, the communication and processing circuitry 1842 may be configured to listen to the respective window of each of the one or more cycles. In some examples, the stationary network entity 1800 may be configured to listen to the respective window of each remaining cycle of the one or more cycles in response to detecting the first reference signal within an initial cycle of the one or more cycles In some examples, the common window configuration 1816 may include a first periodicity 1818 of the respective windows of the one or more cycles (e.g., a window periodicity). The communication and processing circuitry 1842 may be configured to listen to the respective window within select cycles of the one or more cycles based on a second periodicity 1818 associated with the one or more cycles used by the second network entity for reception of the first reference signal. Here, the second periodicity may be a multiple of the first periodicity. In this example, the network entity 1800 may be a stationary network entity or a mobile network entity. The communication and processing circuitry 1842 may be configured to receive the second periodicity 1818 from the central network entity or from the second network entity and to store the second periodicity 1818 within, for example, memory 1805.

In examples in which the network entity 1800 is a mobile network entity, the communication and processing circuitry 1842 may further be configured to receive a third reference signal from a third network entity (e.g., a stationary network entity) on an access link. In some examples, the communication and processing circuitry 1842 may further be configured to receive an individual window configuration 1824 associated with the third network entity and to store the individual window configuration within, for example, memory 1805. The communication and processing circuitry 1842 may further be configured to receive a fourth reference signal from the third network entity based on the individual window configuration.

The communication and processing circuitry 1842 may further be configured to transmit a cross-link interference (CLI) measurement report to the central network entity. The communication and processing circuitry 1842 may further be configured to execute communication and processing instructions (software) 1852 stored on the computer-readable medium 1806 to implement one or more of the functions described here.

The processor 1804 may further include reference signal management circuitry 1844, configured to generate and process reference signals in accordance with at least one of the common window configuration 1816, the individual window configuration 1824, or an access link window configuration (e.g., STC/SMTC window configuration). For example, the reference signal management circuitry 1844 may be configured to use the common window configuration 1816 to transmit and/or receive reference signals between the network entity 1800 and neighbor network entities. The reference signal management circuitry 1844 may further be configured to trigger the common window configuration 1816 upon the occurrence of an event.

In some examples, the reference signal management circuitry 1844 may be configured to select the second occasion on which to transmit the second reference signal. In some examples, the reference signal management circuitry 1844 may be configured to randomly select the second occasion from the plurality of occasions to transmit the second reference signal. In some examples, the reference signal management circuitry 1844 may be configured to operate together with the communication and processing circuitry 1842 to use the second occasion to transmit the second reference signal within each of the one or more cycles or within a subset of the one or more cycles. In some examples, the reference signal management circuitry 1844 may be configured to sense the second occasion for at least one cycle of the one or more cycles to determine whether the second occasion is available and to select the second occasion to transmit the second reference signal in response to determining that the second occasion is available.

In addition, the reference signal management circuitry 1844 may be configured to select a transmit beam for transmission of the second reference signal via the communication and processing circuitry 1842, transceiver 1810, and antenna array(s) 1830. In some examples, the reference signal management circuitry 1844 may be configured to operate together with the communication and processing circuitry 1842, transceiver 1810, and antenna array(s) 1830 to transmit the second reference signal using a different respective transmit beam of a plurality of transmit beams of the network entity 1800 for each cycle of the one or more cycles or for each group of multiple cycles of the one or more cycles.

The reference signal management circuitry 1844 may further be configured to select a receive beam on which to receive to the first reference signal. In some examples, the reference signal management circuitry 1844 may be configured to operate together with the communication and processing circuitry 1842, transceiver 1810, and antenna array(s) 1830 to receive the first reference signal using a different respective receive beam of a plurality of receive beams of the network entity 1800 for each cycle of the one or more cycles or for each group of multiple cycles of the one or more cycles.

The reference signal management circuitry 1844 may further be configured to select a second periodicity 1818 (e.g., and to store the second periodicity 1818 within, for example, memory 1805) for transmission of the second reference signal. Here, the second periodicity is a multiple of a first periodicity 1818 of the respective windows of the one or more cycles indicated by the common window configuration 1816. In some examples, the reference signal management circuitry 1844 may be configured to select the second periodicity based on a velocity of the network entity 1800. The reference signal management circuitry 1844 may further be configured to provide the second periodicity to one or more neighbor network entities (mobile network entities and/or stationary network entities) via the communication and processing circuitry 1842 and transceiver 1810. The reference signal management circuitry 1844 may further be configured to execute reference signal management instructions (software) 1854 stored on the computer-readable medium 1806 to implement one or more functions described herein.

The processor 1804 may further include CLI measurement circuitry 1846, configured to obtain a first CLI measurement 1820 based the first reference signal received from a neighbor (e.g., the second) network entity. For example, the CLI measurement 1820 may be an RSRP or SINR of the first reference signal. In addition, the CLI measurement circuitry 1846 may further be configured to obtain a second CLI measurement 1820 based the third reference signal sent from a stationary (e.g., third) network entity on the access link. The CLI measurement circuitry 1846 may further be configured to obtain a third CLI measurement 1820 based on the fourth reference signal sent from a stationary (e.g., fourth) network entity based on an individual window configuration associated with the stationary network entity.

The CLI measurement circuitry 1846 may further be configured to generate and transmit a CLI measurement report including the CLI measurement 1820 (e.g., first, second, or third CLI measurement) to the central network entity. In some examples, the CLI measurement circuitry 1846 may compare the CLI measurement 1820 (e.g., first, second, or third CLI measurement) to a threshold 1822 maintained in memory 1805 to determine whether to transmit the CLI measurement report. For example, the CLI measurement circuitry 1846 may be configured to generate and transmit the CLI measurement report including the CLI measurement 1820 in response to the CLI measurement 1820 being greater than the threshold 1822. In some examples, the same threshold 1822 may be used for the first, second, and third CLI measurements. In other examples, different thresholds 1822 may be used for the first, second, and third CLI measurements. The CLI measurement circuitry 1846 may further be configured to execute CLI measurement instructions (software) 1856 stored on the computer-readable medium 1806 to implement one or more functions described herein.

Figure 19:
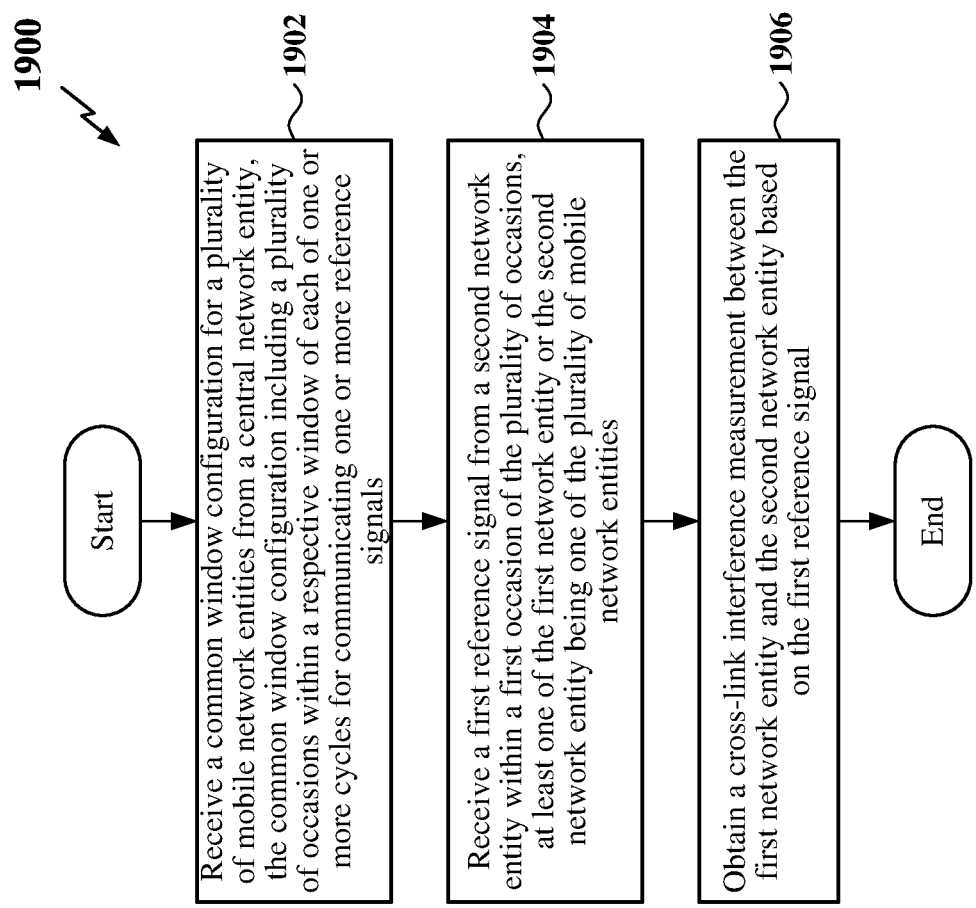
FIG. 19 is a flow chart of an exemplary process for CLI measurement using a common window configuration according to some aspects.

FIG. 19 is a flow chart illustrating an exemplary process 1900 for CLI measurement using a common window configuration according to some aspects. As described below, some or all illustrated features may be omitted in a particular implementation within the scope of the present disclosure, and some illustrated features may not be required for implementation of all embodiments. In some examples, the process 1900 may be carried out by the network entity 1800 illustrated in FIG. 18. In some examples, the process 1900 may be carried out by any suitable apparatus or means for carrying out the functions or algorithm described below.

At block 1902, the network entity may receive a common window configuration for a plurality of mobile network entities from a central network entity, where the common window configuration includes a plurality of occasions within a respective window of each of one or more cycles for communicating one or more reference signals. In some examples, the common window configuration is periodic, aperiodic, semi-persistent, or event triggered. For example, the communication and processing circuitry 1842 together with the transceiver 1810 shown and described above in connection with FIG. 18 may provide a means to receive the common window configuration.

At block 1904, the network entity may receive a first reference signal from a second network entity within a first occasion of the plurality of occasions, where at least one of the first network entity or the second network entity is one of the plurality of mobile network entities. In some examples, the network entity may receive the first reference signal using a different respective receive beam of a plurality of receive beams of the first network entity for each cycle of the one or more cycles or for each group of multiple cycles of the one or more cycles. For example, the communication and processing circuitry 1842, together with the reference signal management circuitry 1844, transceiver 1810, and antenna array(s) 1830 shown and described above in connection with FIG. 18 may provide a means to receive the first reference signal.

At block 1906, the network entity may obtain a cross-link interference measurement indicating the CLI between the first network entity and the second network entity based on the first reference signal. For example, the CLI measurement circuitry 1846 shown and described above in connection with FIG. 18 may provide a means to obtain the CLI measurement.

In one configuration, the network entity includes means for receiving a common window configuration for a plurality of mobile network entities from a central network entity, the common window configuration comprising a plurality of occasions within a respective window of each of one or more cycles for communicating one or more reference signals, means for receiving a first reference signal from a second network entity within a first occasion of the plurality of occasions, at least one of the first network entity or the second network entity being one of the plurality of mobile network entities, and means for obtaining a cross-link interference measurement indicating the CLI between the first network entity and the second network entity based on the first reference signal. In one aspect, the aforementioned means may be the processor 1804 shown in FIG. 18 configured to perform the functions recited by the aforementioned means. In another aspect, the aforementioned means may be a circuit or any apparatus configured to perform the functions recited by the aforementioned means.

Of course, in the above examples, the circuitry included in the processor 1804 is merely provided as an example, and other means for carrying out the described functions may be included within various aspects of the present disclosure, including but not limited to the instructions stored in the computer-readable storage medium 1806, or any other suitable apparatus or means described in any one of the FIGS. 1, 2, 4-8A, 9, 13, and 17, and utilizing, for example, the processes and/or algorithms described herein in relation to FIGS. 9-17 and 19.

Figure 20:
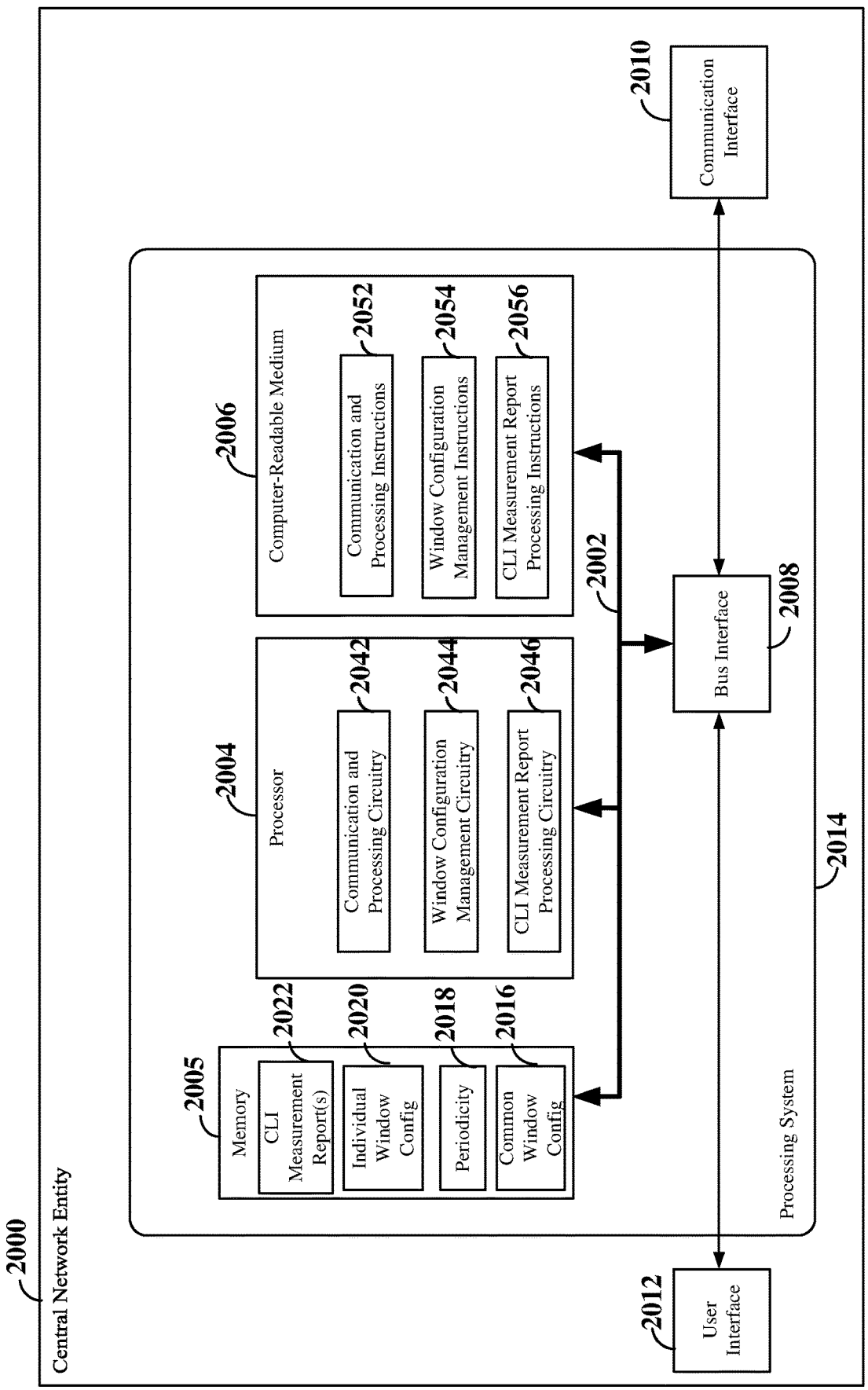
FIG. 20 is a block diagram illustrating an example of a hardware implementation for a central network entity employing a processing system according to some aspects.

FIG. 20 is a block diagram illustrating an example of a hardware implementation of a central network entity 2000 employing a processing system 2014 according to some aspects. The central network entity 2000 may be, for example, a central unit (CU), a Near-Real Time (Near-RT) RAN Intelligent Controller (RIC), a Non-Real Time (Non-RT) RIC, or a core network node (e.g., an OAM function).

In accordance with various aspects of the disclosure, an element, or any portion of an element, or any combination of elements may be implemented with a processing system 2014 that includes one or more processors, such as processor 2004. The processing system 2014 may be substantially the same as the processing system 1814 as shown and described above in connection with FIG. 18, including a bus interface 2008, a bus 2002, a memory 2005, a processor 2004, and a computer-readable medium 2006. Accordingly, their descriptions will not be repeated for the sake of brevity. Furthermore, the central network entity 2000 may include an optional user interface 2012 and a communication interface 2010 (e.g., a network interface and/or transceiver).

The processor 2004, as utilized in the central network entity 2000, may be used to implement any one or more of the processes described below. In some examples, the memory 2005 may store one or more of a common window configuration 2016, one or more periodicities 2018 associated with the common window configuration 2016, an individual window configuration 2020, and a CLI measurement report 2022 for use by the processor 2004 when executing software (instructions) stored on the computer-readable medium 2006.

In some aspects of the disclosure, the processor 2004 may include communication and processing circuitry 2042 configured for various functions, including, for example, communicating with one or more other network entities and/or a core network. In some examples (e.g., in an aggregated base station architecture), the communication and processing circuitry 2042 may include one or more hardware components that provide the physical structure that performs processes related to wireless communication (e.g., signal reception and/or signal transmission) and signal processing (e.g., processing a received signal and/or processing a signal for transmission). In addition, the communication and processing circuitry 2042 may be configured to process and transmit downlink traffic (e.g., packets) and downlink control and receive and process uplink traffic (e.g., packets) and uplink control.

The communication and processing circuitry 2042 may further be configured to provide a common window configuration for a plurality of mobile network entities. The common window configuration may be provided to both mobile network entities and stationary network entities. The communication and processing circuitry 2042 may further be configured to receive at least one cross-link interference (CLI) measurement report 2022 indicating a measured CLI between neighbor network entities, where at least one of the neighbor network entities is one of the plurality of mobile network entities. The communication and processing circuitry 2042 may further be configured to execute communication and processing instructions (software) 2052 stored on the computer-readable medium 2006 to implement one or more functions described herein.

The processor 2004 may further include window configuration management circuitry 2044, configured to generate the common window configuration 2016 and to store the common window configuration 2016 within, for example, memory 2005. For example, the common window configuration 2016 can include a plurality of occasions within a respective window of each of one or more cycles for communicating one or more reference signals. In some examples, the common window configuration 2016 may be periodic, aperiodic, semi-persistent, or event-triggered.

In some examples, the common window configuration 2016 includes a first periodicity 2018 of the respective windows of the one or more cycles. In some examples, the window configuration management circuitry 2044 may be configured to obtain a second periodicity used by a mobile network entity for transmission of reference signals. Here, the second periodicity may be a multiple of the first periodicity. For example, the window configuration management circuitry 2044 may be configured to receive the second periodicity from the mobile network entity (e.g., via one or more other mobile and/or stationary network entities). As another example, the window configuration management circuitry 2044 may be configured to assign or select the second periodicity for the mobile network entity (e.g., based on one or more standards or specifications). The window configuration management circuitry 2044 may further operate together with the communication and processing circuitry 2042 to provide the second periodicity of the mobile network entity to an additional network entity (e.g., a stationary network entity or other mobile network entity) and/or to the mobile network entity.

In some examples, the window configuration management circuitry 2044 may further be configured to generate an individual window configuration 2020 for a stationary network entity and to store the individual window configuration 2020 within, for example, memory 2005. The individual window configuration 2020 may be similar to an STC/SMTC window configuration for the access link. However, the individual window configuration 2020 may include different CLI measurement resources and/or a different periodicity than the STC/SMTC access link window configuration. The window configuration management circuitry 2044 may further be configured to operate together with the communication and processing circuitry 2042 to provide the individual window configuration 2020 for the stationary network entity to the stationary network entity and to at least one mobile network entity nearby the stationary network entity. The window configuration management circuitry 2044 may further be configured to execute window configuration management instructions (software) 2054 stored on the computer-readable medium 2006 to implement one or more functions described herein.

The processor 2004 may further include CLI measurement report processing circuitry 2046, configured to process the CLI measurement report(s) 2022 received from neighbor network entities and to mitigate the CLI between neighbor network entities. For example, the CLI measurement report processing circuitry 2046 may be configured to generate and provide an instruction to the neighbor network entities to synchronize downlink and uplink communications and/or to use transmit/receive beams that may reduce the CLI. In examples in which the neighbor network entities include a stationary network entity and a mobile network entity, the CLI measurement report processing circuitry 2046 may be configured to receive at least one CLI measurement report from the stationary network entity or the mobile network entity. In some examples, the CLI measurement report processing circuitry 2046 is configured to receive a CLI measurement report based on at least one of an access link window configuration (e.g., STC/SMTC window configuration) or the individual window configuration 2020 of the stationary network entity. The CLI measurement report processing circuitry 2046 may further be configured to execute CLI measurement report processing instructions (software) 2056 stored on the computer-readable medium 2006 to implement one or more functions described herein.

Figure 21:
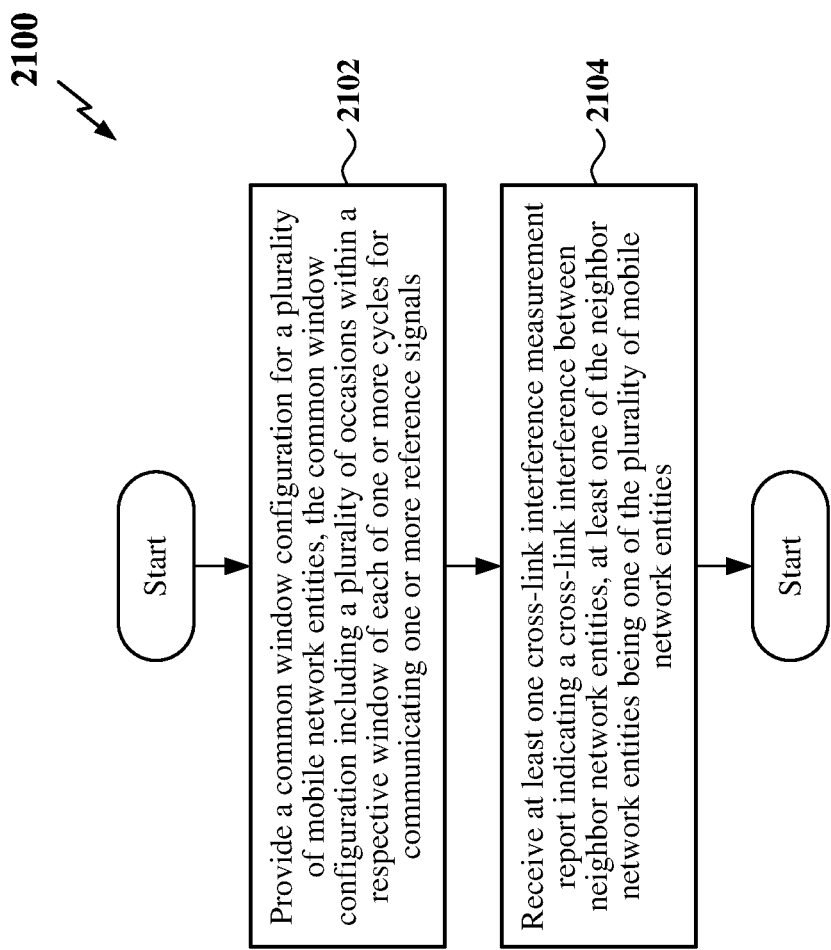
FIG. 21 is a flow chart of an exemplary process for configuring a common window configuration for CLI measurement and reporting according to some aspects.

FIG. 21 is a flow chart illustrating an exemplary process 2100 for configuring a common window configuration for CLI measurement and reporting according to some aspects. As described below, some or all illustrated features may be omitted in a particular implementation within the scope of the present disclosure, and some illustrated features may not be required for implementation of all embodiments. In some examples, the process 2100 may be carried out by the central network entity 2000 illustrated in FIG. 20. In some examples, the process 2100 may be carried out by any suitable apparatus or means for carrying out the functions or algorithm described below.

At block 2102, the central network entity may provide a common window configuration for a plurality of mobile network entities. The common window configuration can include a plurality of occasions within a respective window of each of one or more cycles for communicating one or more reference signals. In some examples, the common window configuration is periodic, aperiodic, semi-persistent, or event-triggered.

In some examples, the neighbor network entities include a mobile network entity of the plurality of mobile network entities and an additional network entity, and the common window configuration includes a first periodicity of the respective windows of the one or more cycles. In this example, the central network entity may provide, to the additional network entity, a second periodicity used by the mobile network entity for transmission of reference signals, where the second periodicity is a multiple of the first periodicity. In some examples, the neighbor network entities include a stationary network entity and a mobile network entity of the plurality of mobile network entities. In this example, the central network entity may further provide an individual window configuration for the stationary network entity to the mobile network entity. For example, the communication and processing circuitry 2042, together with the window configuration management circuitry 2044 and communication interface 2010, shown and described above in connection with FIG. 20 may provide a means to provide the common window configuration.

At block 2104, the central network entity may receive at least one cross-link interference measurement report indicating a cross-link interference between neighbor network entities, where at least one of the neighbor network entities is one of the plurality of mobile network entities. In some examples, the neighbor network entities include a stationary network entity and a mobile network entity of the plurality of mobile network entities. In this example, the central network entity may receive at least one cross-link interference measurement report from the stationary network entity or the mobile network entity. In some examples, the at least one cross-link interference measurement report is based on at least one of an access link window configuration associated with the stationary network entity or an individual window configuration for the stationary network entity. For example, the communication and processing circuitry 2042, together with the CLI measurement report processing circuitry 2046 and communication interface 2010, shown and described above in connection with FIG. 20 may provide a means to receive the at least one cross-link interference measurement report.

In one configuration, the central network entity includes means for providing a common window configuration for a plurality of mobile network entities, the common window configuration including a plurality of occasions within a respective window of each of one or more cycles for communicating one or more reference signals, and means for receiving at least one cross-link interference measurement report indicating a cross-link interference between neighbor network entities, at least one of the neighbor network entities being one of the plurality of mobile network entities. In one aspect, the aforementioned means may be the processor 2004 shown in FIG. 20 configured to perform the functions recited by the aforementioned means. In another aspect, the aforementioned means may be a circuit or any apparatus configured to perform the functions recited by the aforementioned means.

Of course, in the above examples, the circuitry included in the processor 2004 is merely provided as an example, and other means for carrying out the described functions may be included within various aspects of the present disclosure, including but not limited to the instructions stored in the computer-readable storage medium 2006, or any other suitable apparatus or means described in any one of the FIGS. 1, 2, 4-8A, 9, 13, and 17, and utilizing, for example, the processes and/or algorithms described herein in relation to FIGS. 9-17 and 21.

The following provides an overview of aspects of the present disclosure:

Aspect 1: A method operable at a first network entity, the method comprising: receiving a common window configuration for a plurality of mobile network entities from a central network entity, the common window configuration comprising a plurality of occasions within a respective window of each of one or more cycles for communicating one or more reference signals; receiving a first reference signal from a second network entity within a first occasion of the plurality of occasions, at least one of the first network entity or the second network entity being one of the plurality of mobile network entities; and obtaining a cross-link interference measurement indicating a cross-link interference between the first network entity and the second network entity based on the first reference signal.

Aspect 2: The method of aspect 1, wherein the common window configuration is periodic, aperiodic, semi-persistent or event triggered.

Aspect 3: The method of aspect 1 or 2, wherein the receiving the first reference signal further comprises: receiving the first reference signal using a different respective receive beam of a plurality of receive beams of the first network entity for each cycle of the one or more cycles or for each group of multiple cycles of the one or more cycles.

Aspect 4: The method of any of aspects 1 through 3, wherein the first network entity is one of the plurality of mobile network entities, and further comprising: transmitting a second reference signal within a second occasion of the plurality of occasions.

Aspect 5: The method of aspect 4, wherein the transmitting the second reference signal further comprises: transmitting the second reference signal using a different respective transmit beam of a plurality of transmit beams of the first network entity for each cycle of the one or more cycles or for each group of multiple cycles of the one or more cycles.

Aspect 6: The method of aspect 4 or 5, further comprising: listening for additional reference signals from neighbor mobile network entities of the plurality of mobile network entities during remaining occasions of the plurality of occasions of each of the one or more cycles.

Aspect 7: The method of any of aspects 4 through 6, further comprising: randomly selecting the second occasion from the plurality of occasions to transmit the second reference signal.

Aspect 8: The method of aspect 7, further comprising: using the second occasion to transmit the second reference signal within each of the one or more cycles or within a subset of the one or more cycles.

Aspect 9: The method of any of aspects 4 through 6, further comprising: sensing the second occasion for at least one cycle of the one or more cycles to determine whether the second occasion is available for use by the first network entity; and selecting the second occasion to transmit the second reference signal in response to determining that the second occasion is available.

Aspect 10: The method of any of aspects 4 through 9, wherein the common window configuration comprises a first periodicity of the respective windows of the one or more cycles, and the transmitting the second reference signal further comprises: transmitting the second reference signal with a second periodicity, the second periodicity being a multiple of the first periodicity.

Aspect 11: The method of aspect 10, further comprising: selecting the second periodicity based on a velocity of the first network entity.

Aspect 12: The method of any of aspects 1 through 3, wherein the first network entity is a stationary network entity and the second network entity is one of the plurality of mobile network entities.

Aspect 13: The method of aspect 12, further comprising: listening to the respective window of each of the one or more cycles.

Aspect 14: The method of aspect 12, wherein the common window configuration comprises a first periodicity of the respective windows of the one or more cycles, and further comprising: listening to the respective window within select cycles of the one or more cycles based on a second periodicity associated with the one or more cycles used by the second network entity for transmission of the first reference signal, the second periodicity being a multiple of the first periodicity.

Aspect 15: The method of aspect 14, further comprising: receiving the second periodicity from the central network entity or the second network entity.

Aspect 16: The method of any of aspects 12 through 15, further comprising: transmitting a cross-link interference measurement report comprising the cross-link interference measurement to the central network entity in response to the cross-link interference measurement being greater than a threshold.

Aspect 17: The method of any of aspects 12 or 16, further comprising: listening to the respective window of each remaining cycle of the one or more cycles in response to detecting the first reference signal within an initial cycle of the one or more cycles.

Aspect 18: The method of any of aspects 1 through 11, wherein the first network entity is one of the plurality of mobile network entities, and further comprising: receiving a third reference signal from a third network entity on an access link, the third network entity being a stationary network entity; and obtaining a second cross-link interference measurement indicating a second cross-link interference between the first network entity and the third network entity based on the third reference signal.

Aspect 19: The method of aspect 18, further comprising: transmitting a cross-link interference measurement report comprising the second cross-link interference measurement to the central network entity in response to the second cross-link interference measurement being greater than a threshold.

Aspect 20: The method of aspect 18 or 19, further comprising: receiving an individual window configuration associated with the third network entity; receiving a fourth reference signal from the third network entity based on the individual window configuration; and obtaining a third cross-link interference measurement indicating a third cross-link interference between the first network entity and the third network entity based on the fourth reference signal.

Aspect 21: A first network entity comprising a memory and a processor coupled to the memory, the processor configured to perform a method of any one of aspects 1 through 20.

Aspect 22: A first network entity comprising means for performing a method of any one of aspects 1 through 20.

Aspect 23: A non-transitory computer-readable medium having stored therein instructions executable by one or more processors of a first network entity to perform a method of any one of aspects 1 through 20.

Aspect 24: A method operable at a central network entity, the method comprising: providing a common window configuration for a plurality of mobile network entities, the common window configuration comprising a plurality of occasions within a respective window of each of one or more cycles for communicating one or more reference signals; and receiving at least one cross-link interference measurement report indicating a cross-link interference between neighbor network entities, at least one of the neighbor network entities being one of the plurality of mobile network entities.

Aspect 25: The method of aspect 24, wherein the common window configuration is periodic, aperiodic, semi-persistent, or event triggered.

Aspect 26: The method of aspect 24 or 25, wherein the neighbor network entities comprise a mobile network entity of the plurality of mobile network entities and an additional network entity and the common window configuration comprises a first periodicity of the respective windows of the one or more cycles, and further comprising: providing, to the additional network entity, a second periodicity used by the mobile network entity for transmission of reference signals, the second periodicity being a multiple of the first periodicity.

Aspect 27: The method of any of aspects 24 through 26, wherein the neighbor network entities comprise a stationary network entity and a mobile network entity of the plurality of mobile network entities, and wherein the receiving the at least one cross-link interference measurement report further comprises: receiving the at least one cross-link interference measurement report from the stationary network entity or the mobile network entity.

Aspect 28: The method of aspect 27, wherein the at least one cross-link interference measurement report is based on at least one of an access link window configuration associated with the stationary network entity or an individual window configuration for the stationary network entity.

Aspect 29: The method of aspect 28, further comprising: providing the individual window configuration for the stationary network entity to the mobile network entity.

Aspect 30: A central network entity comprising a memory and a processor coupled to the memory, the processor configured to perform a method of any one of aspects 24 through 29.

Aspect 31: A central network entity comprising means for performing a method of any one of aspects 24 through 29.

Aspect 32: A non-transitory computer-readable medium having stored therein instructions executable by one or more processors of a central network entity to perform a method of any one of aspects 24 through 29.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-21 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4-8A, 9, 13, 17, 18, and/or 20 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A first network entity configured for wireless communication, comprising:
one or more memories; and
one or more processors coupled to the one or more memories, wherein the one or more processors are configured to:
receive a common window configuration for a plurality of mobile network entities from a central network entity, the common window configuration comprising a plurality of occasions within a respective window of each of one or more cycles for communicating one or more reference signals, wherein the plurality of occasions are selectable by any of the plurality of mobile network entities;
receive a first reference signal from a second network entity within a first occasion of the plurality of occasions, wherein the plurality of mobile network entities comprises at least the first network entity and the second network entity;
obtain a cross-link interference measurement indicating a cross-link interference between the first network entity and the second network entity based on the first reference signal; and
select a second occasion of the plurality of occasions for transmission of a second reference signal.

2. The first network entity of claim 1, wherein the common window configuration is periodic, aperiodic, semi-persistent or event triggered.

3. The first network entity of claim 1, wherein the one or more processors are further configured to:
receive the first reference signal using a different respective receive beam of a plurality of receive beams of the first network entity for each cycle of the one or more cycles or for each group of multiple cycles of the one or more cycles.

4. The first network entity of claim 1, wherein the one or more processors are further configured to:
transmit the second reference signal within the second occasion of the plurality of occasions.

5. The first network entity of claim 4, wherein the one or more processors are further configured to:
transmit the second reference signal using a different respective transmit beam of a plurality of transmit beams of the first network entity for each cycle of the one or more cycles or for each group of multiple cycles of the one or more cycles.

6. The first network entity of claim 4, wherein the one or more processors are further configured to:
listen for additional reference signals from neighbor mobile network entities of the plurality of mobile network entities during remaining occasions of the plurality of occasions of each of the one or more cycles.

7. The first network entity of claim 4, wherein the one or more processors are further configured to:
randomly select the second occasion from the plurality of occasions to transmit the second reference signal.

8. The first network entity of claim 7, wherein the one or more processors are further configured to:
use the second occasion to transmit the second reference signal within each of the one or more cycles or within a subset of the one or more cycles.

9. The first network entity of claim 4, wherein the one or more processors are further configured to:
sense the second occasion for at least one cycle of the one or more cycles to determine whether the second occasion is available for use by the first network entity; and
select the second occasion to transmit the second reference signal in response to determining that the second occasion is available.

10. The first network entity of claim 4, wherein the common window configuration comprises a first periodicity of the respective windows of the one or more cycles, and wherein the one or more processors are further configured to:
transmit the second reference signal with a second periodicity, the second periodicity being a multiple of the first periodicity.

11. The first network entity of claim 10, wherein the one or more processors are further configured to:
select the second periodicity based on a velocity of the first network entity.

12. The first network entity of claim 1, wherein the one or more processors are further configured to:
receive a third reference signal from a third network entity on an access link, the third network entity being a stationary network entity; and
obtain a second cross-link interference measurement indicating a second cross-link interference between the first network entity and the third network entity based on the third reference signal.

13. The first network entity of claim 12, wherein the one or more processors are further configured to:
transmit a cross-link interference measurement report comprising the second cross-link interference measurement to the central network entity in response to the second cross-link interference measurement being greater than a threshold.

14. The first network entity of claim 12, wherein the one or more processors are further configured to:
receive an individual window configuration associated with the third network entity;
receive a fourth reference signal from the third network entity based on the individual window configuration; and
obtain a third cross-link interference measurement indicating a third cross-link interference between the first network entity and the third network entity based on the fourth reference signal.

15. A first network entity configured for wireless communication, comprising:
one or more memories; and
one or more processors coupled to the one or more memories, wherein the one or more processors are configured to:
receive a common window configuration for a plurality of mobile network entities from a central network entity, the common window configuration comprising a plurality of occasions within a respective window of each of one or more cycles for communicating one or more reference signals, wherein the plurality of occasions are selectable by any of the plurality of mobile network entities, wherein the common window configuration further comprises a first periodicity of the respective windows of the one or more cycles;

listen to the respective window within select cycles of the one or more cycles based on a second periodicity associated with the one or more cycles used by a second network entity for transmission of a first reference signal, the second periodicity being a multiple of the first periodicity;

receive the first reference signal from the second network entity within a first occasion of the plurality of occasions wherein the first network entity is a stationary network entity and the second network entity is one of the plurality of mobile network entities; and obtain a cross-link interference measurement indicating a cross-link interference between the first network entity and the second network entity based on the first reference signal.

16. The first network entity of claim 15, wherein the one or more processors are further configured to:
receive the second periodicity from the central network entity or the second network entity.

17. The first network entity of claim 15, wherein the one or more processors are further configured to:
transmit a cross-link interference measurement report comprising the cross-link interference measurement to the central network entity in response to the cross-link interference measurement being greater than a threshold.

18. A method operable at a first network entity, the method comprising:
receiving a common window configuration for a plurality of mobile network entities from a central network entity, the common window configuration comprising a plurality of occasions within a respective window of each of one or more cycles for communicating one or more reference signals, wherein the plurality of occasions are selectable by any of the plurality of mobile network entities;

receiving a first reference signal from a second network entity within a first occasion of the plurality of occasions, wherein the plurality of mobile network entities comprises at least the first network entity and the second network entity;

obtaining a cross-link interference measurement indicating a cross-link interference between the first network entity and the second network entity based on the first reference signal; and selecting a second occasion of the plurality of occasions for transmission of a second reference signal.

19. The method of claim 18, further comprising:
transmitting the second reference signal within the second occasion of the plurality of occasions.

20. A central network entity, comprising:
one or more memories; and
one or more processors coupled to the one or more memories, wherein the one or more processors are configured to:
provide a common window configuration for a plurality of mobile network entities, the common window configuration comprising a plurality of occasions within a respective window of each of one or more cycles for communicating one or more reference signals, wherein the plurality of occasions are selectable by any of the plurality of mobile network entities, wherein the common window configuration further comprises a first periodicity of the respective windows of the one or more cycles;

receive at least one cross-link interference measurement report indicating a cross-link interference between neighbor network entities, wherein the neighbor network entities comprise a first mobile network entity of the plurality of mobile network entities and an additional network entity; and provide, to the additional network entity, a second periodicity used by the mobile network entity for transmission of reference signals, the second periodicity being a multiple of the first periodicity.

21. The central network entity of claim 20, wherein the common window configuration is periodic, aperiodic, semi-persistent, or event triggered.

22. The central network entity of claim 20, wherein the the additional network entity comprises a stationary network entity, and wherein the one or more processors are further configured to:
receive the at least one cross-link interference measurement report from the stationary network entity or the first mobile network entity.

23. The central network entity of claim 22, wherein the at least one cross-link interference measurement report is based on at least one of an access link window configuration associated with the stationary network entity or an individual window configuration for the stationary network entity.

24. The central network entity of claim 23, wherein the one or more processors are further configured to:
provide the individual window configuration for the stationary network entity to the first mobile network entity.

25. A method operable at a central network entity, the method comprising:
providing a common window configuration for a plurality of mobile network entities, the common window configuration comprising a plurality of occasions within a respective window of each of one or more cycles for communicating one or more reference signals, wherein the plurality of occasions are selectable by any of the plurality of mobile network entities, wherein the common window configuration further comprises a first periodicity of the respective windows of the one or more cycles;

receiving at least one cross-link interference measurement report indicating a cross-link interference between neighbor network entities, wherein the neighbor network entities comprise a first mobile network entity of the plurality of mobile network entities and an additional network entity; and providing, to the additional network entity, a second periodicity used by the mobile network entity for transmission of reference signals, the second periodicity being a multiple of the first periodicity.

26. The method of claim 25, wherein the additional network entity comprises a stationary network entity, and wherein the receiving the at least one cross-link interference measurement report further comprises:
receiving the at least one cross-link interference measurement report from the stationary network entity or the first mobile network entity.

* * * * *